United States Patent
Noh et al.

(10) Patent No.: US 12,137,459 B2
(45) Date of Patent: Nov. 5, 2024

(54) METHOD AND DEVICE FOR TRANSMITTING/RECEIVING DOWNLINK CONTROL CHANNEL FOR WIRELESS COMMUNICATION SYSTEM

(71) Applicant: Samsung Electronics Co., Ltd., Suwon-si (KR)

(72) Inventors: Hoondong Noh, Suwon-si (KR); Youngwoo Kwak, Suwon-si (KR); Younsun Kim, Suwon-si (KR); Jinyoung Oh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 525 days.

(21) Appl. No.: 17/260,937

(22) PCT Filed: Jul. 19, 2019

(86) PCT No.: PCT/KR2019/008933
§ 371 (c)(1),
(2) Date: Jan. 15, 2021

(87) PCT Pub. No.: WO2020/017918
PCT Pub. Date: Jan. 23, 2020

(65) Prior Publication Data
US 2021/0266944 A1    Aug. 26, 2021

(30) Foreign Application Priority Data

Jul. 19, 2018 (KR) .................. 10-2018-0084309

(51) Int. Cl.
*H04W 72/23* (2023.01)
*H04L 5/00* (2006.01)
(Continued)

(52) U.S. Cl.
CPC ........... *H04W 72/23* (2023.01); *H04L 5/0055* (2013.01); *H04W 72/0453* (2013.01); *H04W 72/1273* (2013.01)

(58) Field of Classification Search
CPC . H04W 72/23; H04W 72/04; H04W 72/0453; H04W 72/1273; H04W 28/26;
(Continued)

(56) References Cited

U.S. PATENT DOCUMENTS 11,323,992 B2    5/2022  Zhuang et al.
2010/0331030 A1  12/2010 Nory et al.
(Continued)

FOREIGN PATENT DOCUMENTS

CN    103548409 A    1/2014
CN    107342852 A    11/2017
(Continued)

OTHER PUBLICATIONS

International Search Report and Written Opinion of the International Searching Authority in connection with International Application No. PCT/KR2019/008933 dated Oct. 23, 2019, 10 pages.
(Continued)

*Primary Examiner* — Sudesh M Patidar

(57) ABSTRACT

The present disclosure relates to a communication technique for converging IoT technology with a 5G communication system for supporting higher data transmission rates after 4G systems, and a system for same. The present invention discloses a method and device for efficiently transmitting control information for multiple pieces of data transmitted to a terminal in order to efficiently support cooperative communication. Specifically, a method for a terminal in a wireless communication system to receive downlink data includes steps for: detecting first downlink control information (DCI) scrambled by a cell-radio network temporary
(Continued)

identifier (CRNTI); detecting second DCI scrambled by an RNTI for cooperative communication, when the first DCI has been detected; determining, when the second DCI has been detected, whether the second DCI is valid; and receiving, according to the first DCI and the second DCI, two or more pieces of downlink data when the second DCI has been determined to be valid.

18 Claims, 19 Drawing Sheets

(51) Int. Cl.
*H04W 72/0453* (2023.01)
*H04W 72/1273* (2023.01)

(58) Field of Classification Search
CPC .... H04W 28/16; H04L 5/0055; H04L 5/0007; H04L 5/001; H04L 5/0035; H04L 5/0053; H04L 5/0005; H04L 5/0078; H04L 5/0094; H04L 5/0044
See application file for complete search history.

(56) References Cited

U.S. PATENT DOCUMENTS

| | | | |
|---|---|---|---|
| 2014/0050130 | A1 | 2/2014 | Kim et al. |
| 2015/0208398 | A1 | 7/2015 | Pan et al. |
| 2018/0183551 | A1 | 6/2018 | Chou et al. |
| 2018/0270799 | A1 | 9/2018 | Noh et al. |
| 2020/0045700 | A1* | 2/2020 | Sun ................ H04L 5/0091 |
| 2020/0077432 | A1* | 3/2020 | Xiong ............. H04L 5/0092 |
| 2020/0288447 | A1* | 9/2020 | Shen .............. H04W 72/23 |
| 2020/0358586 | A1* | 11/2020 | Takeda ............ H04L 5/0042 |
| 2021/0045119 | A1* | 2/2021 | Song .............. H04B 7/0691 |
| 2021/0195595 | A1 | 6/2021 | Xiao et al. |
| 2021/0250981 | A1* | 8/2021 | Takeda ........... H04W 72/1273 |

FOREIGN PATENT DOCUMENTS

| | | | | |
|---|---|---|---|---|
| CN | 107835516 | A | | 3/2018 |
| CN | 109699054 | A | | 4/2019 |
| CN | 109474375 | B | * 10/2021 | .......... H04L 1/0023 |
| EP | 3627888 | A1 | | 3/2020 |
| KR | 10-2018-0105555 | A | | 9/2018 |

OTHER PUBLICATIONS

Huawei et al., "DL multi-TRP/panel operation in R15," R1-1802073, 3GPP TSG RAN WG1 Meeting #92, Athens, Greece, Feb. 26-Mar. 2, 2018, 3 pages.
Huawei et al., "Solution and TP for multi-TRP PDCCH transmission," R1-1800824, 3GPP TSG RAN WG1 Ad Hoc Meeting, Vancouver, Canada, Jan. 22-26, 2018, 5 pages.
3GPP TS 38.213 V15.2.0 (Jun. 2018), Technical Specification, 3rd Generation Partnership Project; Technical Specification Group Radio Access Network; NR; Physical layer procedures for control (Release 15), Jun. 2018, 99 pages.
European Patent Office, "Supplementary European Search Report" issued Feb. 18, 2022, in connection with European Patent Application No. 19837492.8, 9 pages.
Samsung, "On timing between DCI indicating active BWP switching and active BWP switching" 3GPP TSG RAN WG1 meeting 91, Reno, USA, Nov. 27-Dec. 1, 2017, R1-1720338, 4 pages.
Office Action dated Aug. 25, 2023, in connection with Chinese Patent Application No. 201980048294.6, 23 pages.
Vivo, "Remaining issues on eMBB DCI format," 3GPP TSG RAN WG1 Meeting #93, R1-1806058, Busan, Korea, May 21-25, 2018, 6 pages.
Korean Intellectual Property Office, "Office Action," issued Jun. 1, 2023, in connection with Korean Patent Application No. 10-2018-0084309, 8 pages.
Nokia et al.,"Remaining details on multi-TRP transmission" 3GPP TSG RAN WG1 #AH, R1-1716494, Sep. 2017, 6 pages.
MCC Support, "Final Report of 3GPP TSG RAN WG1 #92 v1.0.0 (Athens, Greece, Feb. 26-Mar. 2, 2018)", 3GPP TSG RAN WG1 #92, R1-1803571, Apr. 2018, 187 pages.
Office Action issued Jan. 25, 2024, in connection with Chinese Patent Application No. 201980048294.6, 7 pages.
CATT, "Considerations on DL multi panel and multi TRP transmission," 3GPP TSG RAN WG1 #90, R1-1712368, Prague, Czechia, Aug. 2017, 4 pages.

* cited by examiner

Case #1 (1100)　　　　　　　　　　Case #2 (1105)

Case #3 (1110)　　　　　　　　　　Case #4 (1115)

METHOD AND DEVICE FOR TRANSMITTING/RECEIVING DOWNLINK CONTROL CHANNEL FOR WIRELESS COMMUNICATION SYSTEM

CROSS-REFERENCE TO RELATED APPLICATIONS

This application is a 371 National Stage of International Application No. PCT/KR2019/008933, filed Jul. 19, 2019, which claims priority to Korean Patent Application No. 10-2018-0084309, filed Jul. 19, 2018, the disclosures of which are herein incorporated by reference in their entirety.

BACKGROUND

1. Field

The disclosure relates to a wireless communication system and, more specifically, to a method and device for controlling information transmission or reception for efficiently performing coordinated transmission.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

In a 5G communication system, coordinated transmission using a plurality of cells, transmission and reception points (TRP), or beams may be performed, and various service requirements may be satisfied via the coordinated transmission. In particular, joint transmission (JT) is a representative transmission technology for the coordinated transmission, and the technology enables enhancement of the intensity of a signal received by a terminal, by supporting one terminal via different cells, TRPs, and/or beams.

SUMMARY

There is a need to provide a method and device for efficiently transmitting control information for multiple pieces of data transmitted to a terminal, in order to efficiently support coordinated transmission.

The disclosure for solving the above problem relates to a method of a terminal in a wireless communication system, the method including: receiving first downlink control information (DCI) for scheduling of first downlink data; and receiving second DCI for scheduling of second downlink data, wherein, if a first time resource indicated by time axis resource allocation information included in the first DCI and a second time resource indicated by time axis resource allocation information included in the second DCI overlap each other in at least one orthogonal frequency division multiplexing (OFDM) symbol, the first downlink data and the second downlink data scheduled based on the first DCI and the second DCI are allocated to the same first bandwidth part (BWP).

The first DCI and the second DCI may include a BWP indicator configured to have an identical value, and the method may further include: receiving third DCI for scheduling of third downlink data; determining whether the first time resource and a third time resource indicated by time axis resource allocation information included in the third DCI overlap each other in at least one OFDM symbol, and the third downlink data is allocated to the first BWP; and if the first time resource and the third time resource indicated by the time axis resource allocation information included in the third DCI overlap each other in at least one OFDM symbol, and the third downlink data is not allocated to the first bandwidth part, receiving no third downlink data. The first DCI and the second DCI may include frequency axis resource allocation information according to the same frequency axis resource allocation type.

A method of a base station in a wireless communication system includes: transmitting, to a terminal, first downlink control information (DCI) for scheduling of first downlink data; and transmitting, to the terminal, second DCI for scheduling of second downlink data, wherein, if a first time resource indicated by time axis resource allocation information included in the first DCI and a second time resource indicated by time axis resource allocation information included in the second DCI overlap each other in at least one orthogonal frequency division multiplexing (OFDM) symbol, the first downlink data and the second downlink data scheduled based on the first DCI and the second DCI are allocated to the same first bandwidth part (BWP).

A terminal in a wireless communication system includes: a transceiver; and a controller connected to the transceiver, which performs control to receive first downlink control information (DCI) for scheduling of first downlink data and second DCI for scheduling of second downlink data, wherein, if a first time resource indicated by time axis resource allocation information included in the first DCI and a second time resource indicated by time axis resource allocation information included in the second DCI overlap each other in at least one orthogonal frequency division multiplexing (OFDM) symbol, the first downlink data and the second downlink data scheduled based on the first DCI and the second DCI are allocated to the same first bandwidth part (BWP).

A base station in a wireless communication system includes: a transceiver; and a controller connected to the transceiver, which performs control to transmit, to a terminal, first downlink control information (DCI) for scheduling of first downlink data, and transmit, to the terminal, second DCI for scheduling of second downlink data, wherein, if a first time resource indicated by time axis resource allocation information included in the first DCI and a second time resource indicated by time axis resource allocation information included in the second DCI overlap each other in at least one orthogonal frequency division multiplexing (OFDM) symbol, the first downlink data and the second downlink data scheduled based on the first DCI and the second DCI are allocated to the same first bandwidth part (BWP).

According to the disclosure, by proposing a method and device for efficiently designing a configuration of downlink control information supporting coordinated transmission, and authenticating the control information by a terminal receiving the control information, control information that efficiently supports coordinated transmission in a wireless communication system can be transmitted and received.

DETAILED DESCRIPTION

Figure 1:
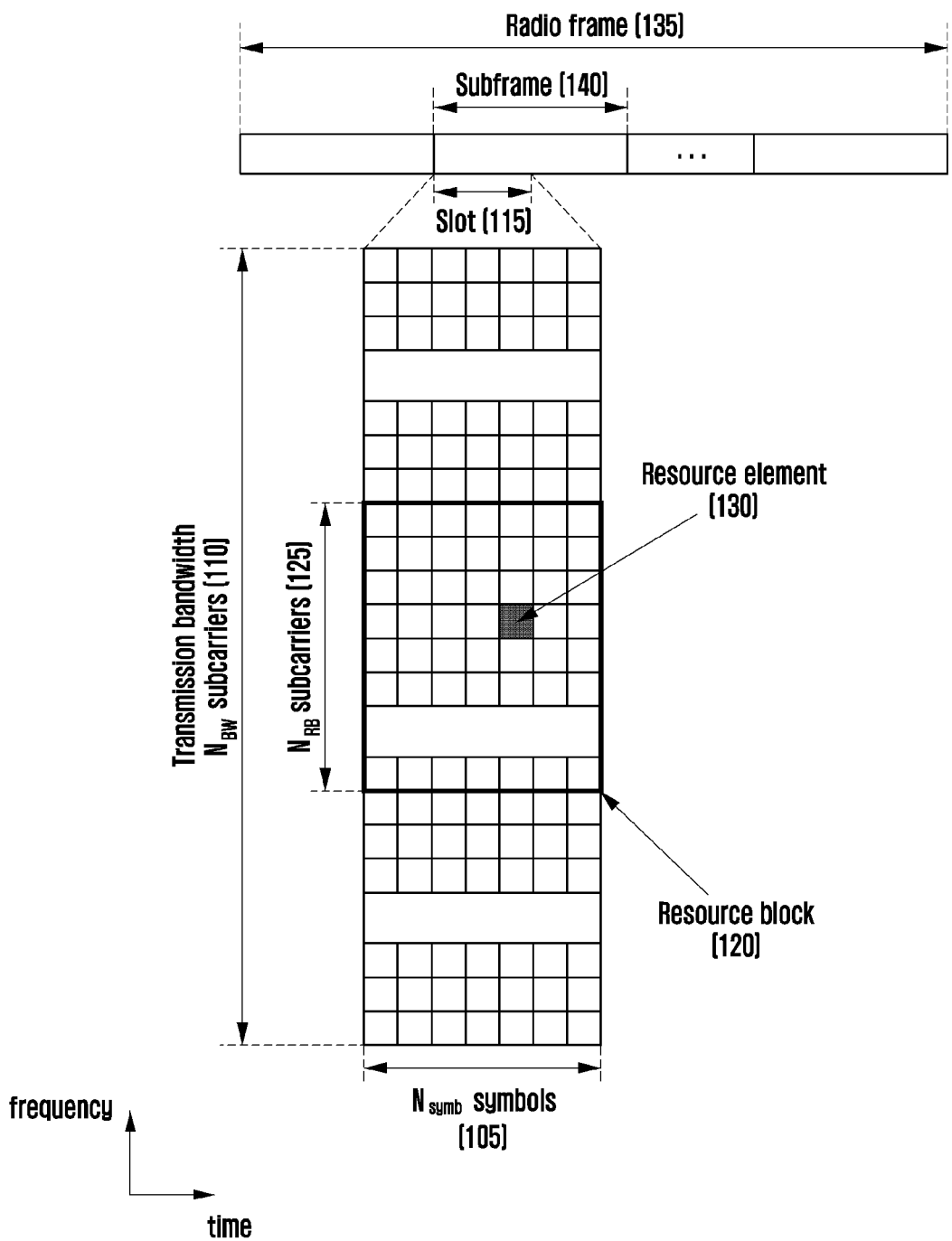
FIG. 1 is a diagram illustrating a time-frequency domain transmission structure of an LTE, LTE-A, NR or similar wireless communication system.

Hereinafter, embodiments of the disclosure will be described in detail with reference to the accompanying drawings.

In describing embodiments of the disclosure, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

Hereinafter, the operation principle of the disclosure will be described in detail in conjunction with the accompanying drawings. In the following description of the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification. In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. Examples of the base station and the terminal are not limited thereto. Further, the disclosure is applicable to FDD and TDD systems.

The disclosure relates to a communication technique for converging IoT technologies with a 5G communication system designed to support a higher data transfer rate beyond the 4G system, and a system therefor. The disclosure may be applied to intelligent services (e.g., smart homes, smart buildings, smart cities, smart cars or connected cars, healthcare, digital education, retail business, security and safety-related services, etc.) on the basis of 5G communication technologies and IoT-related technologies.

In the following description, terms referring to broadcast information, terms related to communication coverage, terms referring to state changes (as an example, event), terms referring to network entities, terms referring to messages, terms referring to device elements, and the like are illustratively used for the sake of convenience. Therefore, the disclosure is not limited by the terms as used below, and other terms referring to subjects having equivalent technical meanings may be used.

In the following description, the disclosure will be described using terms and names defined in the 3rd generation partnership project long term evolution (3GPP LTE) standards for the convenience of description. However, the disclosure is not limited by these terms and names, and may be applied in the same way to systems that conform other standards.

A wireless communication system is evolving from providing early voice-oriented services, to broadband wireless communication systems that provide high-speed and high-quality packet data services, such as communication standards, for example, 3GPP's high speed packet access (HSPA), long term evolution (LTE) or evolved universal terrestrial radio access (E-UTRA), LTE-advanced (LTE-A), LTE-Pro, 3GPP2's high rate packet data (HRPD), ultra-mobile broadband (UMB), IEEE's 802.16e, and the like.

An LTE system, which is a representative example of the broadband wireless communication system, employs an orthogonal frequency division multiplexing (OFDM) scheme in a downlink (DL), and employs a single carrier frequency division multiple access (SC-FDMA) scheme in an uplink (UL). The uplink refers to a radio link via which a terminal transmits data or a control signal to a base station, and the downlink refers to a radio link via which a base station transmits data or a control signal to a terminal. In a multiple access scheme, data or control information of each user is distinguished by assigning and operating time-frequency resources, in which data or control information for each user is carried, so as not to overlap each other, that is, to establish orthogonality.

A 5G communication system (hereinafter, a new radio or next radio (NR) system may be interchangeably used), which is a future communication system after LTE, should be able to freely reflect various requirements of users and service providers, and therefore services that satisfy various requirements should be supported in the 5G communication system. For example, services considered for the 5G communication system may include an enhanced mobile broadband (eMBB) communication, massive machine type communication (mMTC), ultra-reliability low latency communication (URLLC), and the like.

The eMBB aims to provide a data transmission rate that is further improved than a data transmission rate supported by existing LTE, LTE-A, or LTE-Pro. For example, in the 5G communication system, an eMBB should be able to provide a peak data rate of 20 Gbps in a downlink and a peak data rate of 10 Gbps in an uplink, from the perspective of a base station. The eMBB should provide an increased user perceived data rate of the terminal at the same time. In order to satisfy these requirements, improvement of transmission/reception technologies including a more advanced multi-input multi-output (MIMO) transmission technology is required. In addition, a data transmission rate required by the 5G communication system may be satisfied by using a frequency bandwidth wider than 20 MHz in a frequency band of 3 to 6 GHz or a frequency band of 6 GHz or higher, instead of a frequency band of 2 GHz used by the current LTE.

At the same time, mMTC is being considered to support application services, such as the Internet of Things (IoT), in the 5G communication system. In order to efficiently provide the Internet of Things, mMTC may require support for large-scale terminal access in a cell, improved coverage of a terminal, an improved battery time, and a reduced cost of a terminal. The IoT is attached to various sensors and various devices to provide communication functions, so that the IoT should be able to support a large number of terminals (for example, 1,000,000 terminals/km$^2$) within a cell. Further, a terminal supporting mMTC is highly likely to be located in a shaded area that is not covered by the cell, such as the basement of a building, due to the nature of the service, so that it may require wider coverage compared to other services provided in the 5G communication system. Since a terminal supporting mMTC should be a low-cost terminal, and it is difficult to frequently exchange a battery of the terminal, a very long battery life time may be required.

Finally, URLLC, which is a cellular-based wireless communication service used for mission-critical purposes, is used for a remote control for a robot or machinery, industrial automation, an unmanned aerial vehicle, remote health care, an emergency alert, etc., and should provide communication that provides ultra-low latency and ultra-reliability. For example, a service that supports URLLC has requirements of an air interface latency less than 0.5 milliseconds and a packet error rate of 10-5 or less. Therefore, for the service that supports URLLC, the 5G system should provide a transmission time interval (TTI) smaller than that of other services, and at the same time, a design requirement that a wide resource should be allocated in a frequency band is required in the 5G system. However, the above-described mMTC, URLLC, and eMBB are merely examples of different service types, and service types, to which the disclosure is applied, are not limited to the above-described examples.

Services considered in the 5G communication system, which are described above, should be combined with each other and provided on the basis of one framework. That is, for efficient resource management and control, it is desirable that each of services is integrated into one system so as to be controlled and transmitted, rather than operated independently.

Hereinafter, an embodiment will be described using an LTE, LTE-A, LTE-A Pro, or NR system as an example, but the embodiment may also be applied to other communication systems having a similar technical background or channel type. Further, the embodiment may also be applied to other communication systems via some modifications without departing from the scope of the disclosure, according to determination by those skilled in the art. Hereinafter, frame structures of LTE, LTE-A, and 5G systems will be described with reference to the drawings, and a design direction of the 5G system will be described.

FIG. 1 is a diagram illustrating a time-frequency domain transmission structure of an LTE, LTE-A, NR, or similar wireless communication system.

FIG. 1 illustrates a basic structure of a time-frequency resource area that is a radio resource area in which data or control information of LTE, LTE-A, and NR systems based on a single carrier-frequency division multiple access (SC-FDMA) waveform or cyclic prefix (CP) OFDM (CP-OFDM) is transmitted.

In FIG. 1, the horizontal axis represents a time domain and the vertical axis represents a frequency domain. A minimum transmission unit in the time domain of LTE, LTE-A, and 5G systems is an OFDM symbol or an SC-FDMA symbol, and $N_{symb}$ symbols 105 may be gathered and constitute one slot 115. In the case of LTE and LTE-A, two slots including $N_{symb}$ symbols (where $N_{symb}=7$) may be gathered and constitute one subframe 140. According to some embodiments, in the case of a 5G communication system, two types of slot structures, which are a slot and a mini-slot (mini-slot or non-slot) may be supported. In the case of a 5G slot, $N_{symb}$ may have a value of 7 or 14, and in the case of a 5G mini-slot, $N_{symb}$ may be configured to a value of 1, 2, 3, 4, 5, 6, or 7. In LTE and LTE-A, a length of the slot is 0.5 ms, a length of the subframe is fixed at 1.0 ms, but in the case of the 5G communication system, the length of the slot or mini-slot may be changed flexibly according to a subcarrier spacing. In LTE and LTE-A, a radio frame 135 is a time domain unit including 10 subframes.

In LTE and LTE-A, the minimum transmission unit in the frequency domain is a subcarrier in units of 15 kHz (where, a subcarrier spacing is fixed to 15 kHz), and a bandwidth of the entire system transmission bandwidth includes a total of $N_{BW}$ subcarriers 110. The flexible and scalable frame structure of the 5G system will be described later.

A basic unit of the time-frequency resource domain is a resource element (RE) 130 and may be represented by an OFDM symbol or SC-FDMA symbol index and a subcarrier index. A resource block (RB or physical resource block (PRB)) 120 may be defined by $N_{symb}$ consecutive OFDM symbols 105 in the time domain or $N_{RB}$ consecutive subcarriers 125 in the frequency domain and SC-FDMA symbols. Therefore, one RB 120 includes $N_{symb} \times N_{RB}$ REs 130. In the LTE and LTE-A systems, data is mapped in units of RBs, and the base station performs scheduling for a predetermined UE in units of RB-pairs constituting one subframe. The number of SC-FDMA symbols or the number $N_{symb}$ of OFDM symbols is determined according to the length of a cyclic prefix added for each symbol to prevent interference between symbols. For example, when a general CP is applied, $N_{symb}=7$, and when a scalable CP is applied, $N_{symb}=6$. The scalable CP is applied to a system having a relatively larger radio transmission distance compared to the general CP, so as to enable orthogonality between symbols to be maintained. Values, such as a subcarrier spacing, a CP length, etc., are essential information for OFDM transmission or reception, and smooth transmission or reception may be possible only when the base station and the UE recognize the values as common values.

The frame structures of the LTE and LTE-A systems are designed in consideration of conventional voice and data communication, and are subject to limitations in scalability to satisfy various services and requirements, such as a 5G communication system. Therefore, in the 5G system, it is necessary to flexibly define and operate a frame structure in consideration of various services and requirements.

Figure 2:
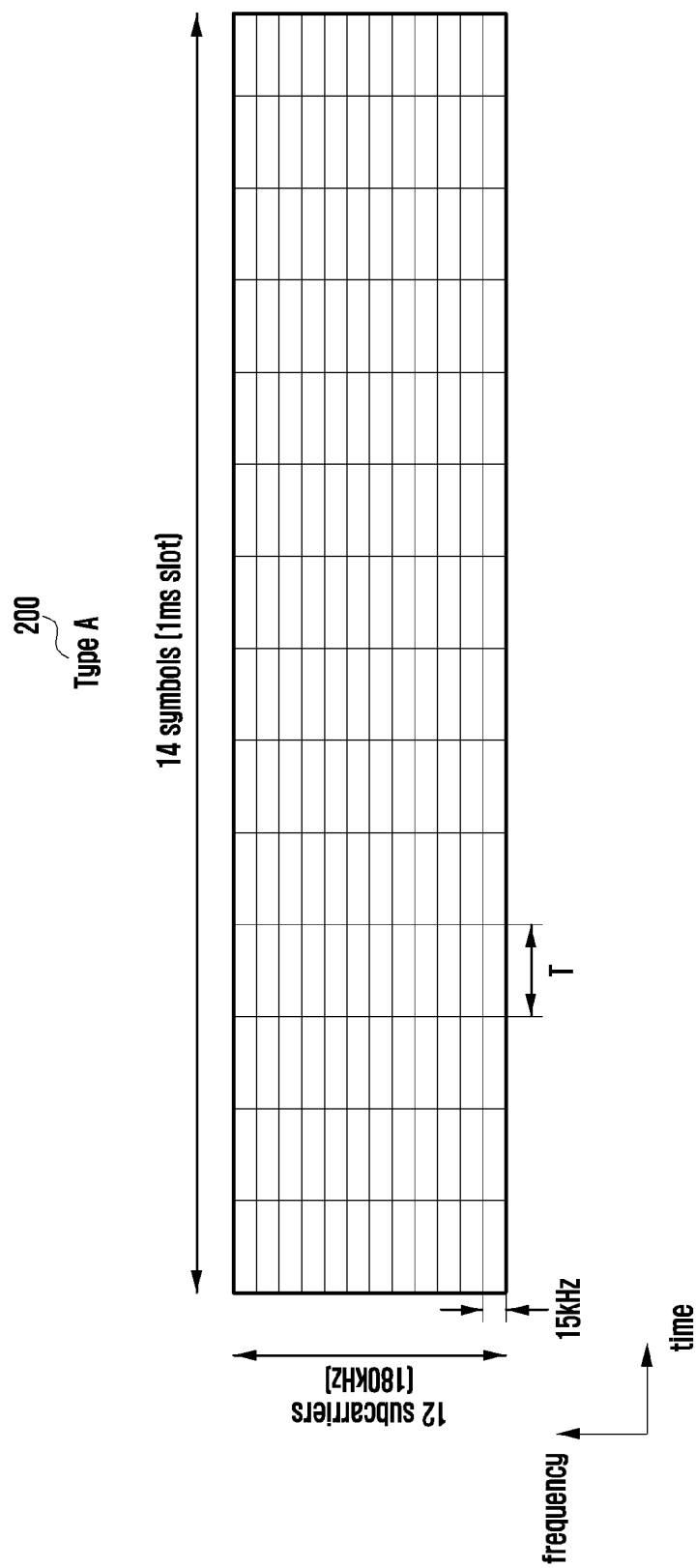
FIG. 2 is a diagram illustrating an example of a scalable frame structure according to an NR system.
Figure 3:
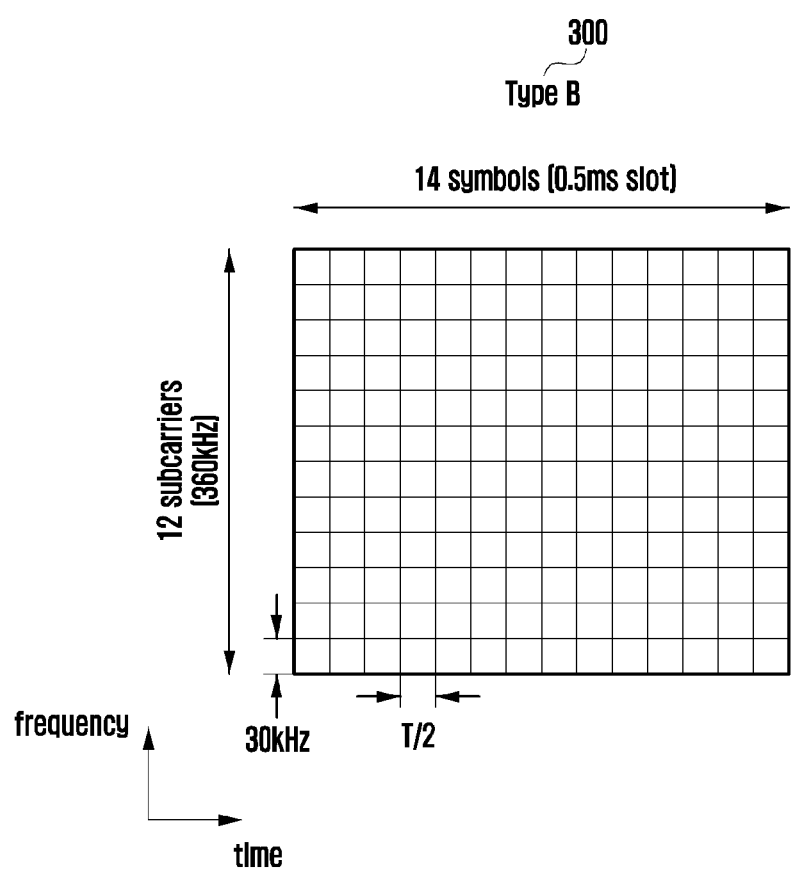
FIG. 3 is a diagram illustrating another example of a scalable frame structure according to an NR system.
Figure 4:
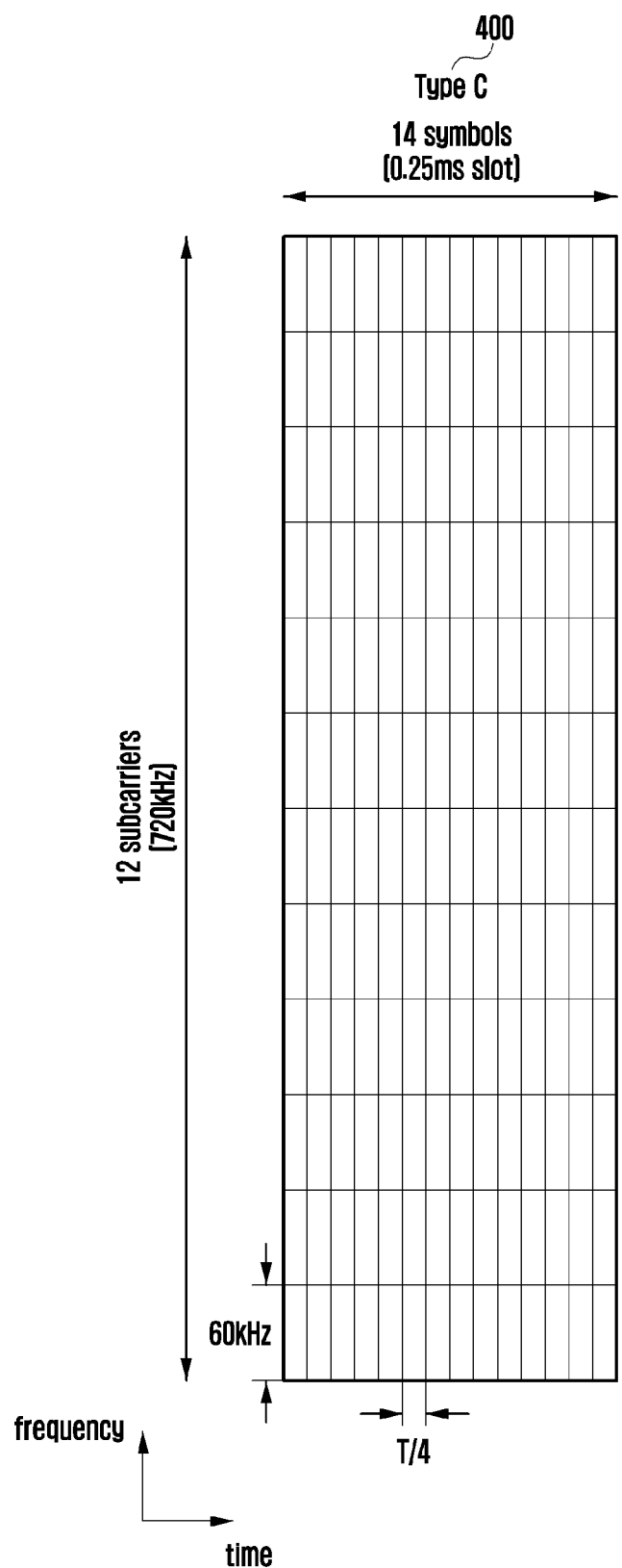
FIG. 4 is a diagram illustrating another example of a scalable frame structure according to the NR system.

FIG. 2, FIG. 3, and FIG. 4 illustrate a scalable frame structure of the 5G system. The examples illustrated in FIG. 2, FIG. 3, and FIG. 4 are based on an essential parameter set defining a scalable frame structure, and the essential parameter set may include a subcarrier spacing, a CP length, a slot length, and the like.

In the early days when the 5G system is introduced, coexistence or dual mode operation with at least existing LTE and LTE-A systems (hereinafter, LTE/LTE-A) is expected. Based on this, the existing LTE/LTE-A may provide a stable system operation, and the 5G system may function to provide an improved service. Therefore, the scalable frame structure of the 5G system needs to include at least the frame structure of LTE/LTE-A or the essential parameter set. In FIG. 2, an essential parameter set or a 5G frame structure, such as the frame structure of LTE/LTE-A, is illustrated. In the case of frame structure type A 200 illustrated in FIG. 2, a subcarrier spacing is 15 kHz, 14 symbols constitute a 1 ms slot, and a physical resource block (PRB) includes 12 subcarriers (=180 kHz=12×15 kHz).

Referring to FIG. 3, in the case of frame structure type B 300 illustrated in FIG. 3, a subcarrier spacing is 30 kHz, 14 symbols constitute a 0.5 ms slot, and a PRB includes 12 subcarriers (=360 kHz=12×30 kHz). That is, compared to frame structure type A, the subcarrier spacing and PRB size are doubled, and the slot length and symbol length are cut in half.

Referring to FIG. 4, in frame structure type C 400 illustrated in FIG. 4, a subcarrier spacing is 60 kHz, 14 symbols constitute a 0.25 ms subframe, and a PRB includes 12 subcarriers (=720 kHz=12×60 kHz). That is, compared to frame structure type A, the subcarrier spacing and PRB size are increased by 4 times, and the slot length and symbol length are decreased by 4 times.

That is, if the frame structure types are generalized, high scalability can be provided by making a subcarrier spacing, a CP length, a slot length, etc., which are included in the essential parameter set, have a relationship of an integer multiple to each other for each frame structure type. Further, a subframe having a fixed length of 1 ms may be defined to indicate a reference time unit irrelevant to the frame structure type. Therefore, one subframe includes one slot in the case of frame structure type A, one subframe includes two slots in the case of frame structure type B, and one subframe includes four slots in the case of frame structure type C. Of course, a scalable frame structure is not limited to the above-described frame structure type A, B, or C, and other subcarrier spacings, such as 120 kHz and 240 kHz, may also be applied, and in this case, it is obvious that different structures are possible.

The frame structure types described above may be applied by corresponding to various scenarios. In terms of a cell size, since a longer CP length is capable of supporting a larger cell, frame structure type A may support a relatively larger cell compared to frame structure types B and C. In terms of an operation frequency band, the larger a subcarrier spacing is, the more advantageous it is to recover phase noise in a high-frequency band, so that frame structure type C may support a relatively higher operation frequency compared to frame structure types A and B. In terms of a service point of view, a shorter subframe length is more advantageous to support an ultra-low latency service such as URLLC, so that frame structure type C is relatively suitable for a URLLC service, compared to frame structure types A and B. Multiple frame structure types may be multiplexed in one system so as to be operated in an integrated manner.

In NR, one component carrier (CC) or serving cell may include up to 250 RBs or more. Therefore, when a UE always receives a signal over the entire serving cell bandwidth, such as in the LTE system, power consumption of the UE may be extreme, and in order to solve this problem, it is possible for a base station to configure one or more bandwidth parts (BWPs) to the UE so as to support the UE to change a reception area within a cell. In the NR system, the base station may configure an "initial bandwidth part (initial BWP)" which is a bandwidth of a control resource set (hereinafter, referred to as CORESET) #0 (or common search space (CSS)), to the UE via a master information block (MIB). Thereafter, the base station may configure an initial BWP (first BWP) of the UE via RRC signaling, and may notify the UE of at least one BWP configuration information via downlink control information (DCI) in the future. Thereafter, the base station may indicate which band the UE will use, by notifying of a BWP ID via DCI. If the UE fails to receive DCI in a currently allocated BWP for a certain time period or longer, the UE returns to a "default bandwidth part" and attempts to receive DCI.

Figure 5:
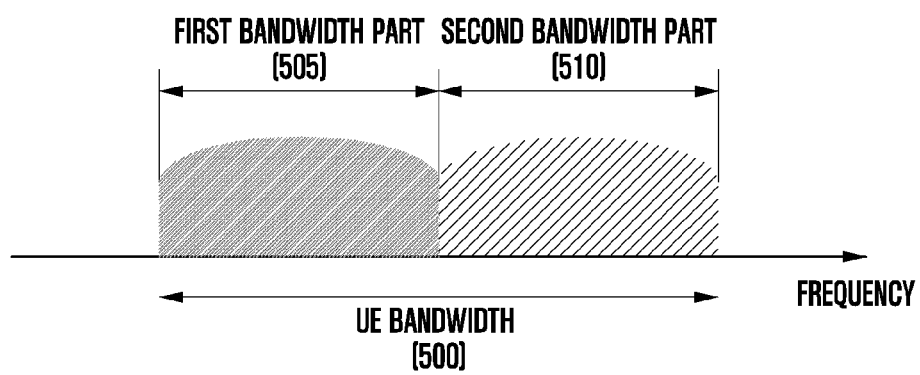
FIG. 5 is a diagram illustrating an example of a bandwidth part configuration according to the NR system.

FIG. 5 is a diagram illustrating an example of a bandwidth part configuration in the 5G communication system. FIG. 5 illustrates an example in which a UE bandwidth 500 is configured to two bandwidth parts, that is, a first bandwidth part 505 and a second bandwidth part 510. A base station may configure one or more bandwidth parts to a UE, and may configure the following information for each bandwidth part.

TABLE 1

Configuration information 1: a bandwidth
of a bandwidth part (the number
of PRBs constituting the bandwidth part)
Configuration information 2: a frequency
position of a bandwidth part (the
information may include an offset
value compared to a reference point,
wherein the reference point may be, for
example, a center frequency of a
carrier, a synchronization signal, a
synchronization signal raster, etc.)
Configuration information 3: numerology
of a bandwidth part (for example, a subcarrier
spacing, a cyclic prefix (CP) length, etc.)
Others In addition to the configuration information, various parameters related to a bandwidth part may be configured to the UE. The base station may transfer the information to the UE via higher layer signaling, for example, RRC signaling. At least one bandwidth part among the configured one or multiple bandwidth parts may be activated. Whether or not to activate the configured bandwidth part may be transferred from the base station to the UE in a semi-static manner via RRC signaling, or may be dynamically transferred via a MAC control element (CE) or DCI.

The configuration of a bandwidth part supported by the 5G communication system may be used for various purposes. For example, when a bandwidth supported by the UE is smaller than a system bandwidth, this may be supported via the bandwidth part configuration. For example, by configuring, for the UE, a frequency position (configuration information 1) of the bandwidth part in Table 1, the UE may transmit or receive data at a specific frequency position within the system bandwidth. As another example, for the purpose of supporting different numerologies, the base station may configure multiple bandwidth parts for the UE. For example, in order to support both data transmission and reception using a subcarrier spacing of 15 kHz and a subcarrier spacing of 30 kHz for the UE, two bandwidth parts may be configured to use the subcarrier spacings of 15 kHz and 30 kHz, respectively. Different bandwidth parts may be frequency division multiplexed (FDM), and when the base station and the UE are to transmit or receive data at a specific subcarrier spacing, a bandwidth part configured at the subcarrier spacing may be activated.

As another example, for the purpose of reducing power consumption of the UE, the base station may configure, for the UE, a bandwidth part having a different bandwidth size. For example, if the UE supports a very large bandwidth, for example, 100 MHz, and always transmits or receives data via the corresponding bandwidth, very large power consumption may occur. In particular, in a situation where there is no traffic, it is very inefficient, in terms of power consumption, for the UE to monitor an unnecessary downlink control channel for a large bandwidth of 100 MHz. Therefore, for the purpose of reducing the power consumption of the UE, the base station may configure, for the UE, a bandwidth part of a relatively small bandwidth, for example, a bandwidth part of 20 MHz. In the situation where there is no traffic, the UE may perform monitoring in the bandwidth part of 20 MHz, and if data is generated, the UE may transmit or receive the data by using the bandwidth part of 100 MHz according to an indication of the base station.

Figure 6:
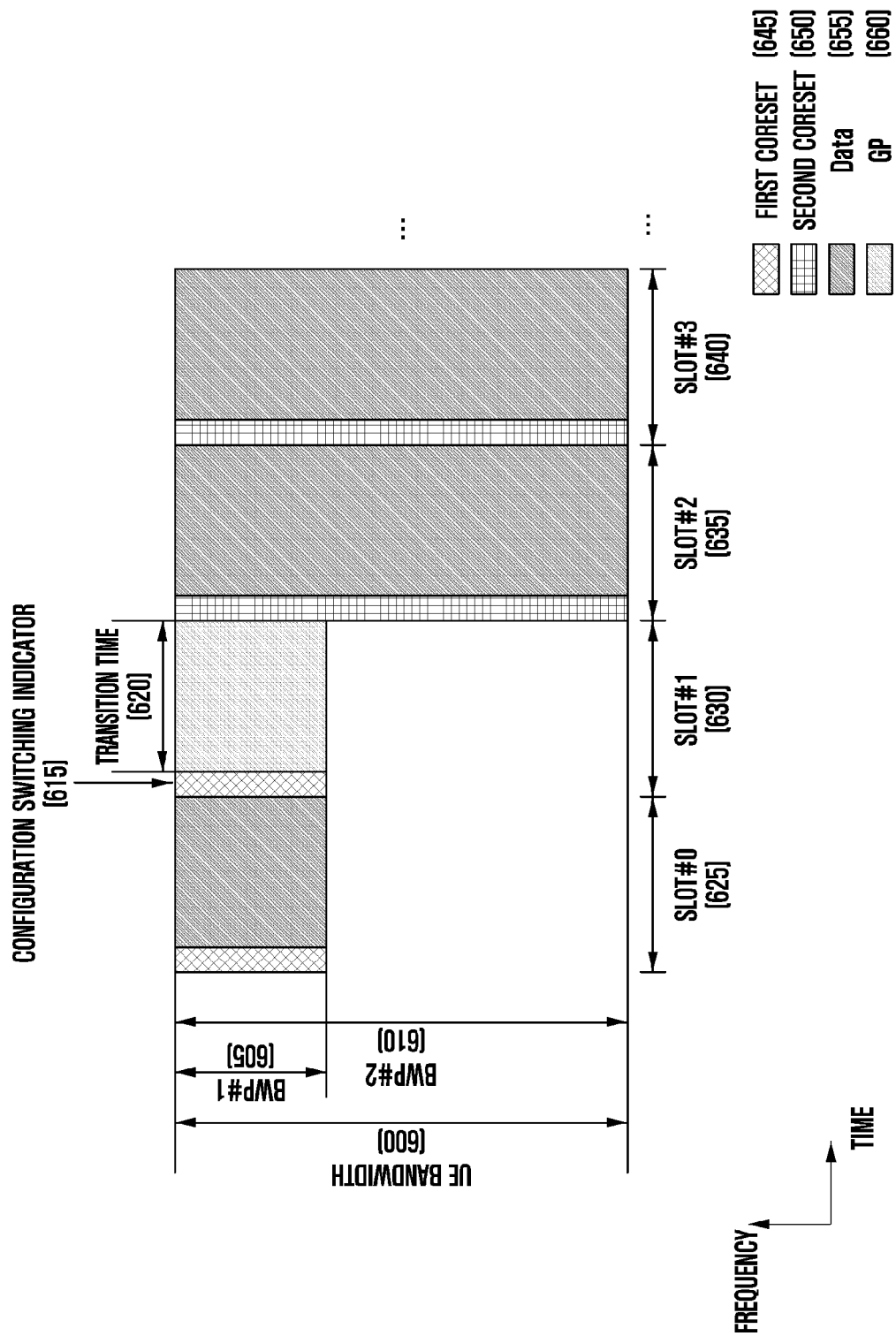
FIG. 6 is a diagram illustrating another example of a bandwidth part indication and change according to the NR system.

FIG. 6 is a diagram illustrating a method of changing a dynamic configuration for a bandwidth part.

As described in Table 1, a base station may configure one or more bandwidth parts for a UE, and information on a bandwidth of a bandwidth part, a frequency position of the bandwidth part, and the numerology of the bandwidth part, may be informed as a configuration for each bandwidth part. FIG. 6 illustrates an example in which two bandwidth parts are configured within a UE bandwidth 600 for one UE, wherein the two bandwidth parts include a first bandwidth part (BWP #1) 605 and a second bandwidth part (BWP #2) 610. One or multiple bandwidth parts in the configured bandwidth may be activated, and a case where one bandwidth part is activated is considered in FIG. 6. In FIG. 6, BWP #1 605 among bandwidth parts configured in slot #0 625 is activated, the UE may monitor PDCCH in in a first control area (first CORESET, 645) configured in BWP #1 605, and data 655 may be transmitted or received in BWP #1 605. A control area in which the UE receives PDCCH may be different according to a bandwidth part, which is activated, among the configured bandwidth parts, and a bandwidth in which the UE monitors the PDCCH may vary accordingly.

The base station may additionally transmit, to the UE, an indicator for switching the configuration of the bandwidth part. Here, switching of the configuration of the bandwidth part may be considered to be the same as an operation of activating a specific bandwidth part (for example, changing of activation from bandwidth part A to bandwidth part B). The base station may transmit a configuration switching indicator to the UE in a specific slot, and the UE may receive the configuration switching indicator from the base station, may determine a bandwidth part to be activated, by applying a switched configuration according to the configuration switching indicator from a specific time point, and then may monitor PDCCH in a control area configured in the activated bandwidth part.

In FIG. 6, the base station may transmit, to the UE, a configuration switching indicator 615 that indicates switching of the activated bandwidth part from existing BWP #1 605 to BWP #2 610, in slot #1 630. After receiving the corresponding indicator, the UE may activate BWP #2 610 according to the content of the indicator. At this time, a transition time 620 for switching the bandwidth part may be required, and accordingly, a point in time when the active bandwidth part is switched and applied may be determined. FIG. 6 illustrates a case in which the transition time 620 of one slot is taken after the configuration switching indicator 615 is received. Data transmission or reception may not be performed during the transition time (that is, it may be understood as a guard period (GP) 660). Accordingly, bandwidth part #2 610 is activated in slot #2 635 and slot #3 640 so that the UE may transmit or receive control information and data via the corresponding bandwidth part. The UE may monitor PDCCH in a second CORESET 650 of BWP #2 610.

The base station may preconfigure one or multiple bandwidth parts for the UE via higher layer signaling (e.g., RRC signaling), and the configuration switching indicator 615 may indicate activation, by mapping with one of the bandwidth part configurations preconfigured by the base station. For example, an indicator of $\log_2 N$ bits may select and indicate one of N preconfigured bandwidth parts. Table 2 below is an example of indicating configuration information for a bandwidth part by using a 2-bit indicator.

TABLE 2

| Indicator value | Bandwidth part configuration |
| --- | --- |
| 00 | Bandwidth configuration A configured via higher layer signaling |
| 01 | Bandwidth configuration B configured via higher layer signaling |
| 10 | Bandwidth configuration C configured via higher layer signaling |
| 11 | Bandwidth configuration D configured via higher layer signaling |

The configuration switching indicator 615 for the bandwidth part described above may be transferred from the base station to the UE in the form of medium access control (MAC) control element (CE) signaling or L1 signaling (e.g., common DCI, group-common DCI, and UE-specific DCI).

A point in time, at which bandwidth part activation is to be applied according to the configuration switching indicator 615 for the bandwidth part described above, is as follows. The point in time, at which a configuration switch is to be applied, may be based on a predefined value (for example, applied from the back of N(=1) slot after the configuration switching indicator is received), may be configured by the base station for the UE via higher layer signaling (e.g., RRC signaling), or may be partially included in the content of the configuration switching indicator 615 and transmitted. Alternatively, the point in time may be determined by a combination of the above methods. After receiving the configuration switching indicator 615 for the bandwidth part, the UE may apply the switching configuration from the time point obtained by the above method.

Figure 7:
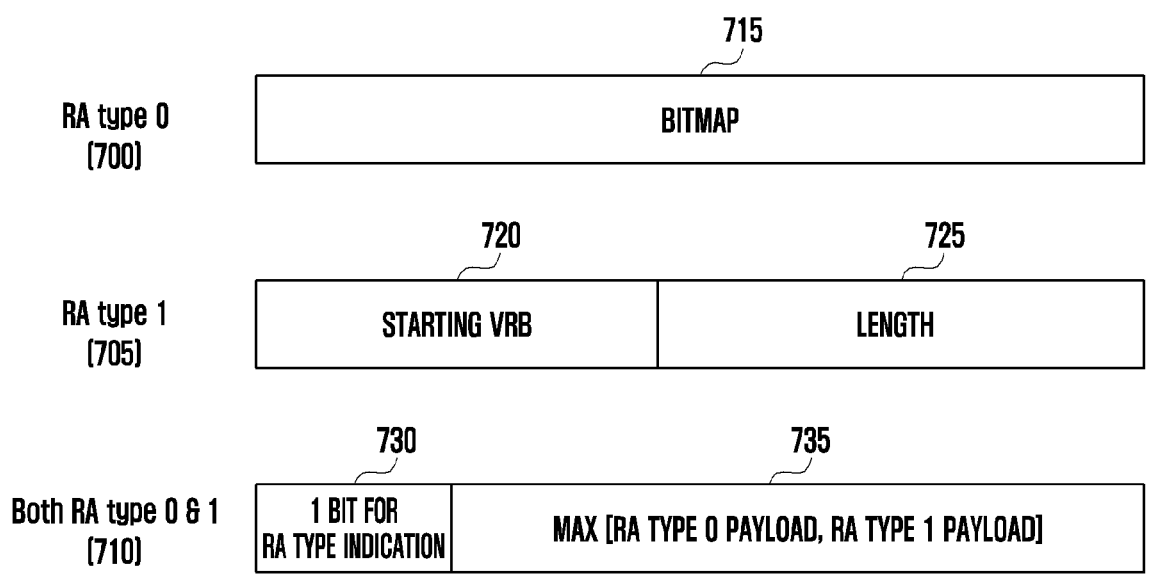
FIG. 7 is a diagram illustrating an example of PDSCH frequency axis resource allocation according to the NR system.

In the NR system, the following detailed frequency axis resource allocation methods (frequency domain resource allocation (FD-RA)) are provided in addition to frequency axis resource candidate allocation via the bandwidth part indication. FIG. 7 is a diagram illustrating a frequency axis resource allocation method used in the NR system. This method may be configured via a higher layer, and there are three methods, such as type 0 700, type 1 705, and a dynamic switch 710.

If a UE is configured to use only resource allocation (RA) type 0, via higher layer signaling 700, a part of DCI for allocation of PDSCH to the UE includes a bitmap including $N_{RBG}$ bits. Conditions for this will be described later. In this case, $N_{RBG}$ refers to the number of resource block groups (RBGs), which is determined as shown in Table 3 below according to the size of BWP allocated by the BWP indicator and a higher layer parameter of rbg-Size, and data is transmitted to an RBG indicated by 1 by the bitmap.

TABLE 3

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

If the UE is configured to use only RA type 1, via the higher layer signaling 705, a part of the DCI for allocation of PDSCH to the UE includes frequency axis resource allocation information including $\lceil \log_2(N_{RB}^{DL,BWP}(N_{RB}^{DL,BWP}+1)/2) \rceil$ bits. Conditions for this will be described later. Based on this, a base station is able to configure a starting VRB 720 and a length 725 of a frequency axis resource continuously allocated therefrom. If the UE is configured to use both RA type 0 and RA type 1, via the higher layer signaling 710, a part of the DCI for allocation of PDSCH to the UE includes frequency axis resource allocation information including bits of a larger value 735 among a payload 715 for RA type 0 and a payload 720, 725 for RA type 1. Conditions for this will be described later. In the case of 0 due to addition of one bit to a most significant bit (MSB) of the frequency axis resource allocation information in the DCI, RA type 0 is indicated to be used, and in the case of 1, RA type 1 is indicated to be used.

Figure 8:
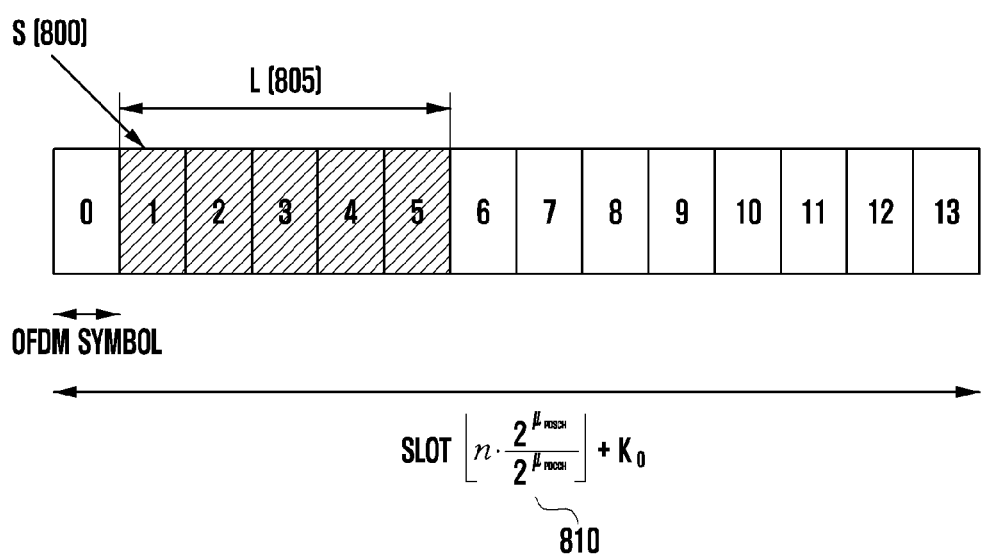
FIG. 8 is a diagram illustrating an example of PDSCH time axis resource allocation according to the NR system.

FIG. 8 is a diagram illustrating an example of time axis resource allocation in the NR system. Referring to FIG. 8, a base station may indicate a time axis position of a PDSCH resource according to $\mu_{PDSCH}$ and $\mu_{PDCCH}$ which are subcarrier spacings of a control channel (physical downlink control channel, PDCCH) and a data channel (physical downlink shared channel, PDSCH) that are configured via a higher layer, a scheduling offset ($K_0$) value, and an OFDM symbol starting position 800 and a length 805 within one slot (slot $$\left\lfloor n \cdot \frac{2^{\mu_{PDSCH}}}{2^{\mu_{PDCCH}}} \right\rfloor + K_0,$$

810) dynamically indicated via DCI.

Figure 9:
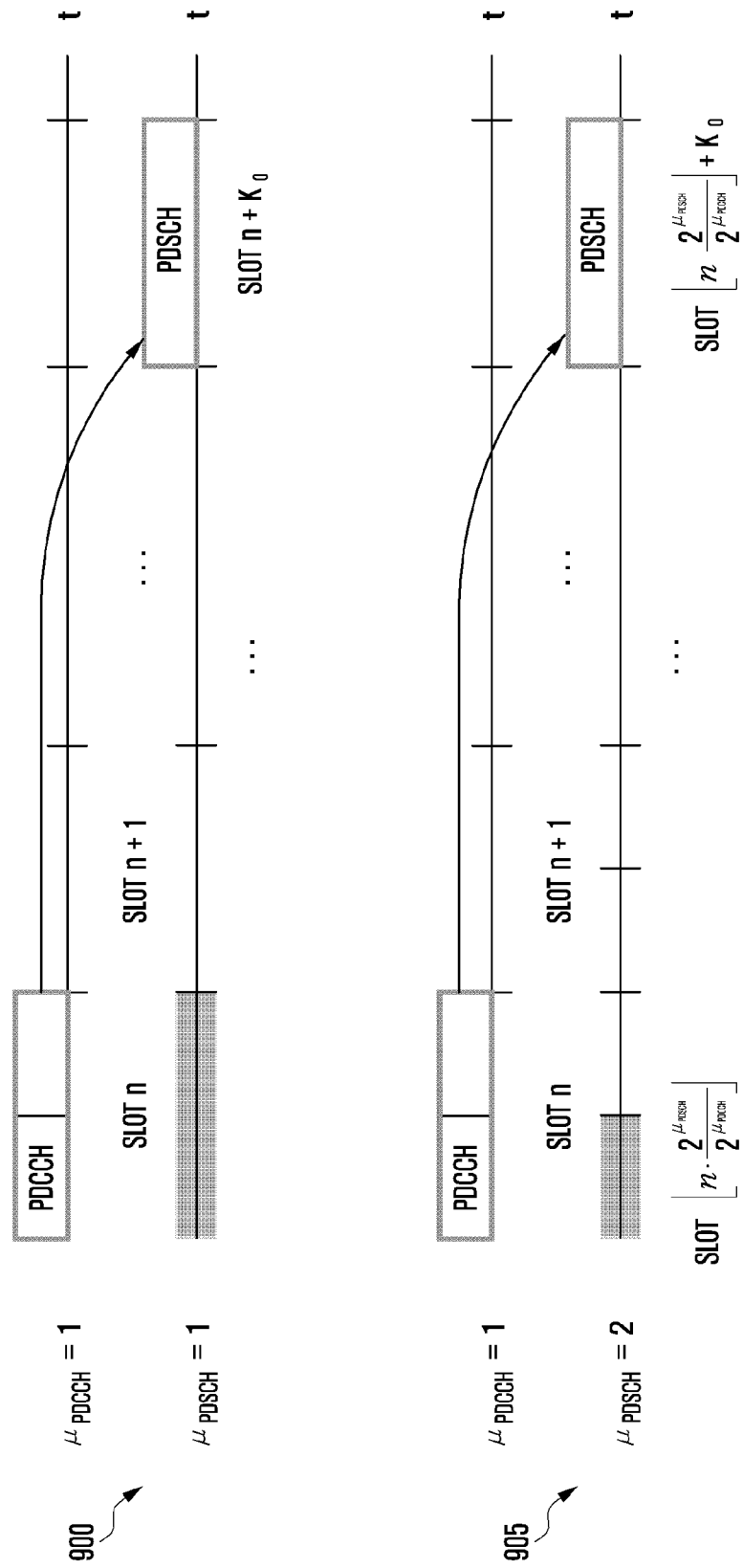
FIG. 9 is a diagram illustrating another example of PDSCH time axis resource allocation according to the NR system.

FIG. 9 is a diagram illustrating an example of time axis resource allocation according to subcarrier spacings of a control channel and a data channel. Referring to FIG. 9, if subcarrier spacings of a data channel and a control channel are the same (900, $\mu_{PDSCH}\neq\mu_{PDCCH}$), each slot number of the data channel and control channel is the same, so that a base station and a UE may check a scheduling offset on the basis of a predetermined slot offset of $K_0$. On the other hand, if the subcarrier spacings of the data channel and the control channel are different (905, $\mu_{PDSCH}\neq\mu_{PDCCH}$), each slot number of the data channel and the control channel is different, so that the base station and the UE may check a scheduling offset on the basis of the predetermined slot offset of $K_0$ according to the subcarrier spacing of the data channel.

The NR system provides various types of DCI formats as shown in Table 4 below according to the purpose, for efficient control channel reception by the UE.

TABLE 4

| DCI format | Usage |
|---|---|
| 0_0 | Scheduling of PUSCH in one cell |
| 0_0 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

For example, the base station may use DCI format 1_0 or DCI format 1_1 to allocate (schedule) PDSCH to one cell.

DCI format 1_0 includes at least the following information when transmitted with a CRC scrambled with a new RNTI, a configured scheduling RNTI (CS-RNTI), or a cell radio network temporary identifier (C-RNTI):

Identifier for DCI formats (1 bits): DCI format indicator that is always configured to 1

Frequency domain resource assignment $$(\lceil \log_2(N_{RB}^{DL,BW}(N_{RB}^{DL,BWP}+1)/2) \rceil \text{ bits}):$$

Indicating frequency axis resource allocation, wherein, if DCI format 1_0 is monitored in a UE-specific search space, $$N_{RB}^{DL,BWP}$$

is the size of an activated DL bandwidth part, and otherwise, $$N_{RB}^{DL,BWP}$$

is the size of an initial DL BWP. For details, refer to the above-described frequency axis resource allocation.

Time domain resource assignment (4 bits): Indicating time axis resource allocation according to the above description VRB-to-PRB mapping (1 bit): Indicating non-interleaved if 0, and indicating interleaved VRP-to-PRB mapping if 1

Modulation and coding scheme (MCS, 5 bits): Indicating a modulation order and a coding rate used for PDSCH transmission New data indicator (NDI, 1 bit): Indicating whether a corresponding PDSCH is initial transmission or retransmission, depending on toggle Redundancy version (RV, 2 bits): Indicating a redundancy version used for PDSCH transmission HARQ process number (4 bits): Indicating a Hybid automatic repeat request (HARQ) processor number used for PDSCH transmission Downlink assignment index (2 bits): Downlink allocation index (DAI) indicator TPC command for scheduled PUCCH (physical uplink control channel) (2 bits): Power control indicator for PUCCH transmission power control PUCCH resource indicator (3 bits): PUCCH resource indicator that indicates one of eight resources configured via a higher layer PDSCH-to-HARQ_feedback timing indicator (3 bits): HARQ feedback timing indicator that indicates one of eight feedback timing offsets configured via the higher layer DCI format 1_1 includes at least the following information when transmitted with a CRC scrambled with a new-RNTI, a CS-RNTI, or a C-RNTI:

Identifier for DCI formats (1 bit): DCI Format indicator that is always configured to 1

Carrier indicator (0 or 3 bits): Indicating a CC (or cell) in which PDSCH allocated by corresponding DCI is transmitted Bandwidth part indicator (0, 1, or 2 bits): Indicating a BWP in which PDSCH allocated by the DCI is transmitted Frequency domain resource assignment: Indicating frequency axis resource allocation, and a payload of DCI is determined according to the frequency axis resource allocation. For a detailed method, refer to the above-described frequency axis resource allocation.

Time domain resource assignment (4 bits): Indicating time axis resource allocation according to the above description VRB-to-PRB mapping (0 or 1 bit): Indicating non-interleaved if 0, and indicating interleaved VRP-to-PRB mapping if 1. 0 bit if the frequency axis resource allocation is configured to RA type 0.

PRB bundling size indicator (0 or 1 bit): 0 bit if a higher layer parameter of prb-BundlingType is not configured or is configured to be "static", and 1 bit if the same is configured to be "dynamic"

Rate matching indicator (0 or 1 or 2 bits): Indicating a rate matching pattern

ZP CSI-RS trigger (0 or 1 or 2 bits): Indicator to trigger an aperiodic ZP CSI-RS For transport block 1:

Modulation and coding scheme (5 bits): Indicating a modulation order and coding rate used for PDSCH transmission New data indicator (1 bit): Indicating whether PDSCH is initial transmission or retransmission, depending on toggle Redundancy version (2 bits): Indicating a redundancy version used for PDSCH transmission For transport block 2:

Modulation and coding scheme (5 bits): Indicating a modulation order and coding rate used for PDSCH transmission New data indicator (1 bit): Indicating whether PDSCH is initial transmission or retransmission, depending on toggle Redundancy version (2 bits): Indicating a redundancy version used for PDSCH transmission HARQ process number (4 bits): Indicating an HARQ process number used for PDSCH transmission Downlink assignment index (0, 2, or 4 bits): DAI indicator TPC command for scheduled PUCCH (2 bits): PUCCH transmission power control indicator PUCCH resource indicator (3 bits): PUCCH resource indicator that indicates one of eight resources configured via a higher layer PDSCH-to-HARQ_feedback timing indicator (3 bits): HARQ feedback timing indicator that indicates one of eight feedback timing offsets configured via the higher layer Antenna port (4 or 5 or 6 bits): Indicating a DMRS port and a CDM group without data Transmission configuration indication (0 or 3 bits): TCI indicator SRS request (2 or 3 bits): SRS transmission request indicator CBG transmission information (0 or 2 or 4 or 6 or 8 bits): Indicator indicating whether code block groups in the allocated PDSCH are transmitted. 0 indicates that a corresponding CBG is not transmitted, and 1 indicates that the CBG is transmitted.

CBG flushing out information (0 or 1 bit): Indicator indicating whether previous CBGs are contaminated, wherein 0 indicates that the CBGs may be contaminated, and 1 indicates that the CBGs may be available (combinable) when receiving retransmission. If 1, the UE may receive retransmitted data and combine the same with the previous CBG.

DMRS sequence initialization (0 or 1 bit): Indicator for selecting a DMRS scrambling ID The maximum number of DCI of different sizes, which the UE can receive per slot in a corresponding cell, is 4, and the maximum number of DCI of different sizes scrambled with a C-RNTI, which the UE can receive per slot in the cell, is 3.

Referring to the DCI structure, in release 15, NR DCI formats 1_0 and 1_1 are focused on allocating PDSCH transmitted at a single transmission point, and additional standard support is required in the case of coordinated transmission in which a single UE receives PDSCH transmitted at multiple points. For example, the control information includes information related to HARQ, such as frequency axis and time axis resource allocation information, antenna allocation information, MCS, etc., each of which corresponds to one PDSCH, and therefore a method of extending the information is required to allocate two or more PDSCHs.

In the disclosure, a DCI design method for efficiently allocating the multiple PDSCHs to one UE and a method for the UE to check the effectiveness of receiving multiple pieces of DCI may be provided to improve the efficiency of coordinated transmission.

Hereinafter, in the disclosure, higher layer signaling is a signal transferring method, in which a signal is transferred from a base station to a UE by using a downlink data channel of a physical layer or a signal is transferred from a UE to a base station by using an uplink data channel of a physical layer, wherein the higher layer signaling may be referred to as RRC signaling, packet data convergence protocol (PDCP) signaling, or a medium access control (MAC) control element (CE) (MAC CE). The configuration via a higher layer may be understood as the configuration based on information transferred using the higher layer signaling. PDCCH transmission/reception or control channel transmission/reception may be understood as DCI transmission/reception via PDCCH, and likewise, PDSCH transmission/reception or data channel transmission/reception may be understood as transmission/reception of DL data via PDSCH. This technique may also be applied to an uplink channel.

Hereinafter, in the disclosure, the examples are described via a plurality of embodiments. However, these are not independent, and one or more embodiments may be applied simultaneously or in combination.

First Embodiment

Unlike the conventional system, the 5G wireless communication system can support not only a service requiring a high transmission rate, but also a service having a very short transmission delay and a service requiring a high connection density. In a wireless communication network including multiple cells, transmission and reception points (TRPs), or beams, coordinated transmission between respective cells, TRPs, or/and beams is one of element techniques capable of satisfying various service requirements by increasing the intensity of a signal received by a UE or efficiently performing TRP or/and inter-beam interference control.

Joint transmission (JT) is a representative transmission technology for the coordinated transmission, and the technology enables enhancement of the intensity of a signal received by a UE, by supporting one UE via different cells, TRPs, and/or beams. Characteristics of each cell, TRP, or/and beam-to-UE channel may differ greatly, and therefore different precoding, MCS, resource allocation, etc. need to be applied to each cell, TRP, or/and beam-to-UE link.

In particular, in the case of non-coherent joint transmission (NC-JT) supporting non-coherent precoding between each cell, TRP, or/and beam, an individual DL transmission information configuration for the each cell, TRP, or/and beam becomes important. However, the individual DL transmission information configuration for the each cell, TRP, or/and beam becomes a major factor in increasing a payload required for DL DCI transmission, and this may adversely affect reception performance of PDCCH transmitting DCI. Therefore, it is necessary to carefully design a tradeoff between the amount of DCI information and the PDCCH reception performance, for JT support.

Figure 10A:
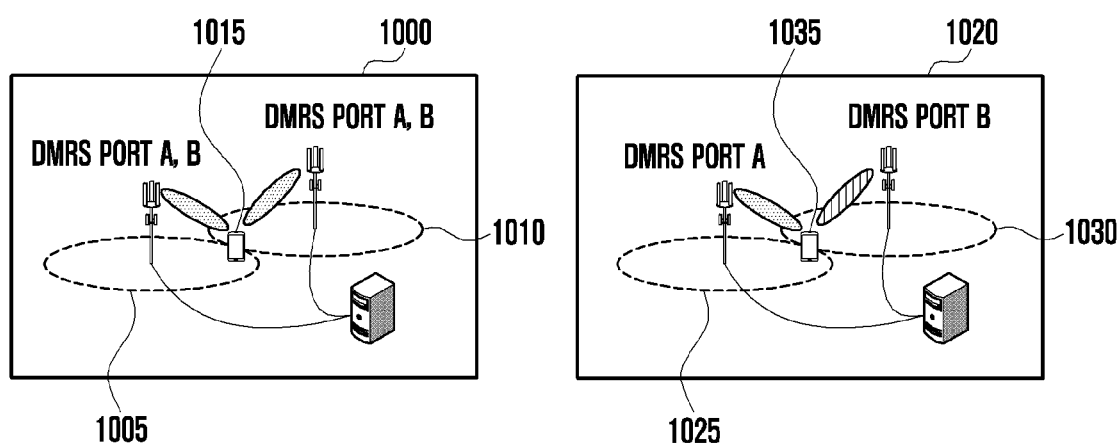
FIG. 10A is a diagram illustrating an example of an antenna port configuration when coordinated transmission is performed.

FIG. 10A is a diagram illustrating each joint transmission scheme. Reference numeral 1000 is a diagram illustrating coherent joint transmission (C-JT) supporting coherent precoding between each cell, TRP, or/and beam. In the C-JT, TRP A 1005 and TRP B 1010 transmit the same data (PDSCH), and joint precoding is performed in multiple TRPs. This indicates that TRP A 1005 and TRP B 1010 transmit data by using the same DMRS ports (e.g., DMRS ports A and B in both TRPs) for reception of the same PDSCH. In this case, a UE 1015 will receive one piece of DCI information for reception of one PDSCH demodulated by DMRS ports A and B.

Reference numeral 1020 is a diagram illustrating non-coherent joint transmission supporting non-coherent precoding between each cell, TRP, or/and beam. In the case of the NC-JT, different PDSCHs are transmitted in each cell, TRP, or/and beam, and individual precoding may be applied to each PDSCH. This indicates that TRP A 1025 and TRP B 1030 transmit data by using different DMRS ports (e.g., DMRS port A in TRP A and DMRS port B in TRP B) for reception of the different PDSCHs. In this case, a UE 1035 will receive two types of DCI information for reception of PDSCH A demodulated by DMRS port A and PDSCH B demodulated by DMRS port B.

Figure 10B:
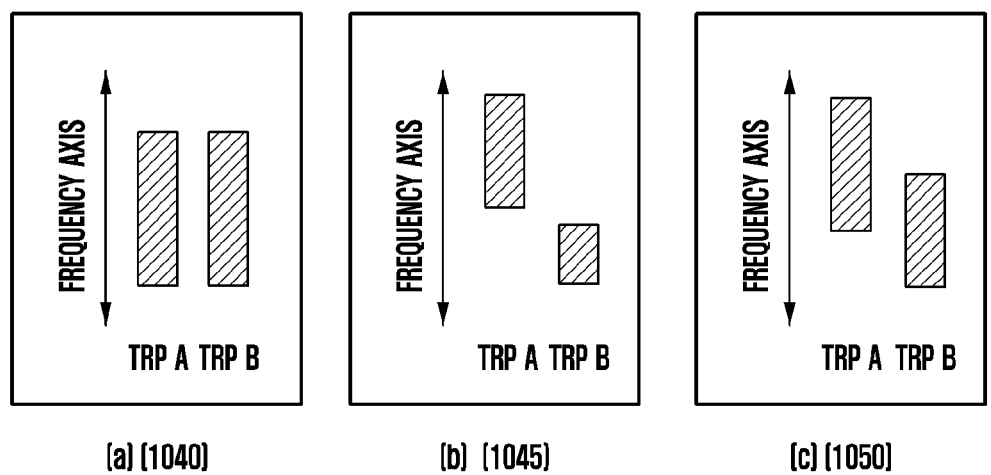
FIG. 10B is a diagram illustrating an example of resource allocation when coordinated transmission is performed.

FIG. 10B is a diagram illustrating an example of radio resource allocation according to a situation in the case of joint transmission. For example, in the case of the NC-JT, according to FIG. 10B, various radio resource allocations can be considered, wherein the various radio resource allocations includes a case 1040 where frequency and time resources used by multiple TRPs are the same, a case 1045 where the frequency and time resources used by multiple TRPs do not overlap at all, and a case 1050 where some of the frequency and time resources used by multiple TRPs overlap. In particular, in the case as reference numeral 1050, it may be seen that a DCI payload required for resource allocation information increases linearly according to the number of TRPs. Such an increase in a DL DCI payload may adversely affect reception performance of PDCCH transmitting DCI or may significantly increase complexity of DCI blind decoding of the UE. Therefore, the disclosure provides a DCI design method for efficiently supporting NC-JT.

Figure 11:
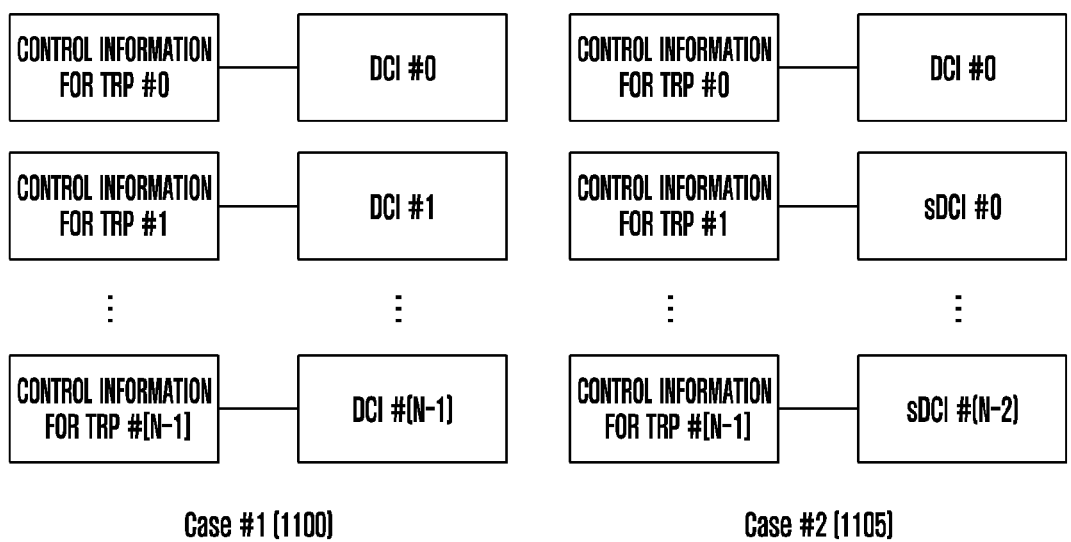
FIG. 11 is a diagram illustrating an example of a DCI configuration for coordinated transmission.
Figure 11:
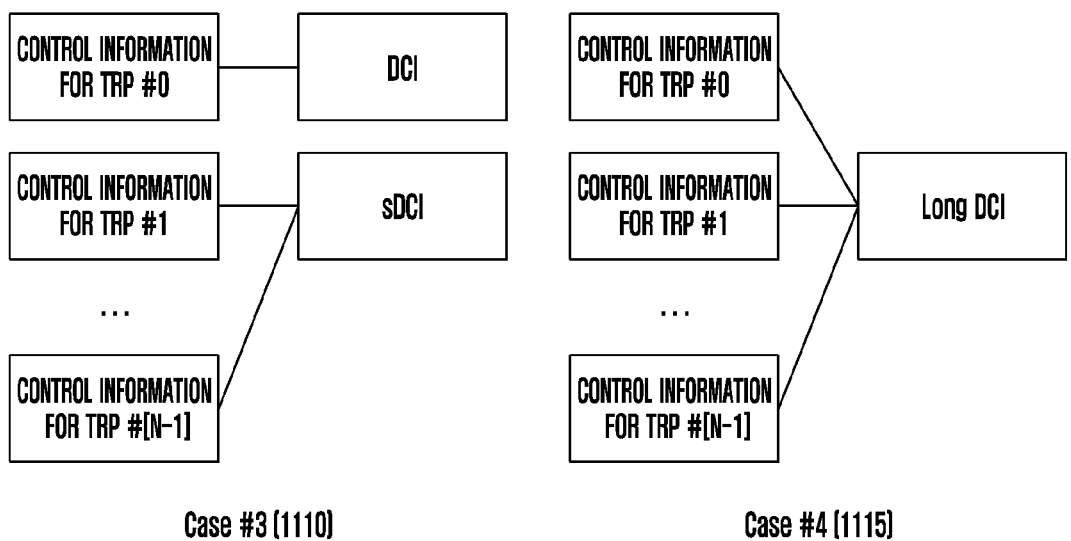

FIG. 11 is a diagram illustrating four examples of a DCI design for NC-JT support.

In FIG. 11, case #1 1100 is a case in which, in a situation where (N−1) different PDSCHs are transmitted in (N−1) additional TRPs (TRP #1 to TRP #(N−1)) other than a serving TRP (TRP #0) used at single PDSCH transmission, control information for the PDSCH transmitted in the additional TRPs is transmitted in the form (the same DCI format) as that of control information for the PDSCH transmitted in the serving TRP. That is, a UE acquires control information on PDSCHs transmitted in different TRPs (coordinated TRPs, TRP #0 to TRP #(N−1)) via all DCI (DCI #0 to DCI #(N−1)) having the same DCI format and the same payload. Case #1 1100 has an advantage that the degree of freedom (i.e., the degree of freedom in PDSCH allocation such as resource allocation) to control each PDSCH is fully guaranteed, but if each piece of DCI is transmitted in a different TRP, there is a disadvantage that a difference in coverage for each piece of DCI occurs and therefore the reception performance may be deteriorated. That is, when the DCI is transmitted in a TRP other than the serving TRP, there may be a disadvantage that the PDCCH reception performance may be deteriorated.

Case #2 1105 is a case in which, in a situation where (N−1) different PDSCHs are transmitted in (N−1) additional TRPs (TRP #1 to TRP #(N−1)) other than a serving TRP (TRP #0) used at single PDSCH transmission, control information for the PDSCH transmitted in the additional TRPs is transmitted via different DCI (payload) or in a format (different DCI format) different from that that of control information for the PDSCH transmitted in the serving TRP. For example, in a case of DCI #0 for transmission of control information for PDSCH transmitted in the serving TRP (TRP #0), all information elements of DCI format 1_0 to DCI format 1_1 are included. However, in a case of "shortened" DCI (sDCI #0 to sDCI #(N−2)) for transmission of control information for PDSCHs transmitted in coordinated TRPs (TRP #1 to TRP #(N−1)), only a part of information elements of DCI format 1_0 to DCI format 1_1 may be included. Therefore, in a case of sDCI for transmission of the control information for PDSCHs transmitted in the coordinated TRPs, it may be possible that the sDCI has a smaller payload compared to normal DCI (nDCI) for transmission of the control information related to PDSCH transmitted in the serving TRP, or includes as many reserved bits as the number of bits fewer than that of nDCI. Case #2 has a disadvantage that the degree of freedom for controlling (allocation) of each PDSCH may be restricted depending on the contents of information elements included in the sDCI. However, since the reception performance of sDCI becomes superior to that of nDCI, there is an advantage that a probability of occurrence of a coverage difference per DCI decreases. That is, even if sDCI is transmitted in the coordinated TRPs, the reception performance of sDCI becomes excellent, so that the coverage may not differ from that of nDCI.

Case #3 1110 is a case in which, in a situation where (N−1) different PDSCHs are transmitted in (N−1) additional TRPs (TRP #1 to TRP #(N−1)) other than a serving TRP (TRP #0) used at single PDSCH transmission, control information for the PDSCH transmitted in the additional TRPs is transmitted via different DCI (payload) or in a format (different DCI format) different from that of control information for the PDSCH transmitted in the serving TRP. For example, in the case of DCI #0 for transmission of the control information for PDSCH transmitted in the serving TRP (TRP #0), all information elements of DCI format 1_0 to DCI format 1_1 are included. Further, in the case of the control information for PDSCHs transmitted in the coordinated TRPs (TRP #1 to TRP #(N−1)), it may be possible to collect only some of information elements of DCI format 1_0 to DCI format 1_1 in "secondary" DCI (hereinafter, sDCI) so as to transmit the same.

For example, the sDCI may include at least one piece of information in HARQ related information, such as frequency axis resource allocation, time axis resource allocation, and MCS of coordinated TRPs. In addition, in the case of information that is not included in sDCI, such as a BWP indicator or a carrier indicator, it is possible for the UE to follow the information of nDCI (DCI #0) of the serving TRP. Case #3 1110 has a disadvantage that the degree of freedom for controlling (allocation) of each PDSCH may be restricted depending on the contents of the information element included in sDCI. However, there is an advantage that the reception performance of sDCI can be adjusted, and the complexity of DCI blind decoding of the UE is reduced compared to case #1 or #2.

Case #4 1115 is a case where, in a situation where (N−1) additional TRPs (TRP #1 to TRP #(N−1)) other than the serving TRP (TRP #0) used at single PDSCH transmission are transmitted in (N−1) different PDSCHs, the control information for the PDSCH transmitted in the additional TRPs and the control information for PDSCH transmitted in the serving TRP are transmitted via the same DCI (long DCI or lDCI). That is, the UE acquires the control information for PDSCHs transmitted in different TRPs (TRP #0 to TRP #(N−1)) via a single piece of DCI. Case #4 1115 has an advantage that a DCI blind decoding complexity of the UE does not increase, but has a disadvantage that the degree of freedom for PDSCH controlling (allocation) is low, for example, the number of coordinated TRPs is restricted according to long DCI payload restriction.

In the following descriptions and embodiments, sDCI may refer to various auxiliary DCI, such as shortened DCI, secondary DCI, normal DCI (DCI formats 1_0 to 1_1 described above) including PDSCH control information transmitted in the coordinated TRP, or long DCI, and the descriptions may be applied to the various auxiliary DCI if no special restriction is specified.

The following descriptions and embodiments provide a method for a detailed configuration of sDCI for cases #1, #2, and #3 and methods of determining validity (validation, which may be interchangeably used with authentication, verification, etc.) when the UE receives sDCI.

In embodiments, "coordinated TRP" may be replaced with various terms, such as "coordinated panel" or "coordinated beam" when actually applied. In embodiments, "a case where NC-JT is applied" can be interpreted in various ways according to a situation, but one expression is used for the convenience of explanation, wherein the case may be interpreted as "a case where the UE receives PDSCH on the basis of two or more TCI indications simultaneously in one Bandwidth part (that is, it may be understood as a case where the UE simultaneously receives downlink data corresponding to each of two or more TCIs indicated via one or more pieces of DCI in one BWP)", "a case where PDSCH received by the UE is associated with one or more DMRS port groups (that is, when one PDSCH allocated by one piece of DCI is associated with multiple DMRS port groups, different QCL signaling or a different TCI indication may be applied to each of the DMRS port groups)", and the like.

Second Embodiment

In the embodiment, detailed configuration methods of sDCI according to cases #1 1100, #2 1105, and #3 1110 of the first embodiment will be described.

In Case #1, as described in the first embodiment, the control information for PDSCH transmitted in both the serving TRP and the coordinated TRP can be transmitted via the same DCI format, for example, DCI format 1_1. The UE can assume that the some restrictions are applied to control information of an additional PDSCH other than the PDSCH transmitted in the serving TRP.

The control information of the PDSCH transmitted in the serving TRP may be referred to as various expressions and is referred to as nDCI for the convenience in this description, wherein the various expressions includes "first DCI for data allocation to a corresponding PDSCH transmission time point", "first detected DCI in DCI for data allocation to a the PDSCH transmission time point", "DCI transmitted in a position of a PDCCH candidate group of a lowest index, a (UE-specific) search space of a lowest (or highest) ID, or a (UE-specific) CORESET of a lowest (or highest) ID, in the DCI for data allocation to the PDSCH transmission time point".

The control information of the additional PDSCH may be referred to as various expressions, and is referred to as sDCI for the convenience in this description, wherein the various expressions includes "second or subsequent DCI for data allocation to a corresponding PDSCH transmission point", "DCI detected after the second DCI in the DCI for data allocation to the PDSCH transmission point", or "DCI transmitted outside a search space or CORESET of a lowest ID (excluding a common CORESET) in the DCI for data allocation to the PDSCH transmission point". In the following embodiments, nDCI and sDCI for allocation of PDSCH transmitted in at least one same OFDM symbol to the UE are referred to as associated DCI (associated nDCI and sDCI).

In case #1, the UE may assume at least one of the following restrictions upon reception of sDCI for NC-JT:

One of possible restrictions on sDCI in case #1 is a BWP indicator. BWP indicators of nDCI and sDCI that allocate, to one UE, PDSCH for the same transmission point (the same OFDM symbol) should indicate the same value, and if the BWP indicator of nDCI and the BWP indicator of sDCI have different values, the UE disregards sDCI (that is, it is determined that sDCI has failed CRC matching (CRC non-matched)). This is to ensure that the UE receives a single activated BWP regardless of whether or not coordinated transmission is applied. For another method for this, it is possible that the base station always pads, with a constant value, the BWP indicator of sDCI, and the UE applies the BWP indicator value of nDCI to sDCI in the same manner.

Figure 12:
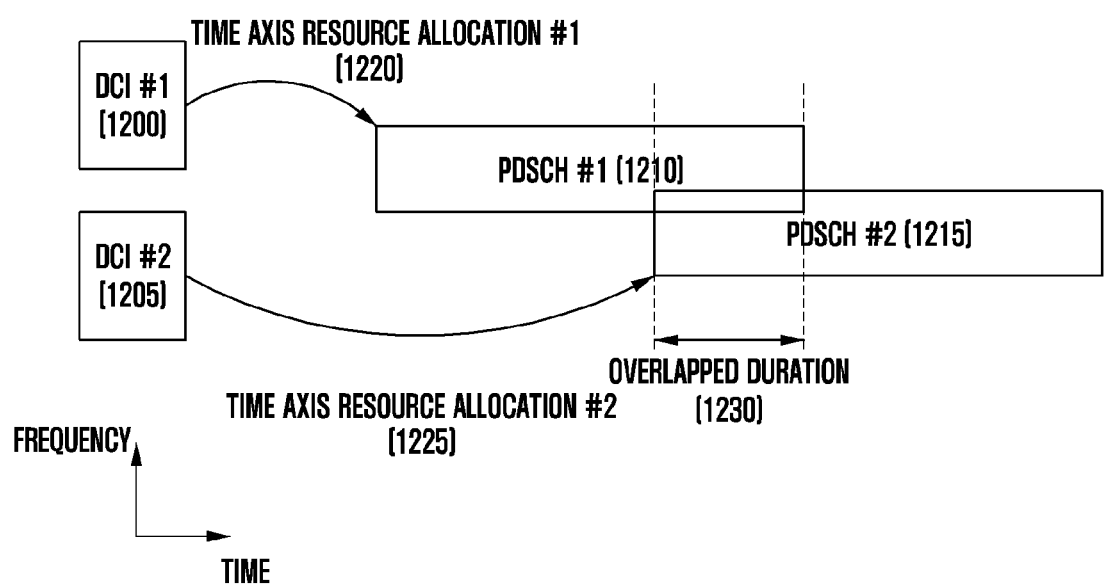
FIG. 12 is a diagram illustrating an example of coordinated transmission time axis resource allocation.

One of possible restrictions on sDCI in case #1 is time axis resource allocation (time domain resource assignment). FIG. 12 is a diagram illustrating an example of time axis resource allocation for NC-JT. Referring to FIG. 12, DCI #1 (nDCI) 1200 and DCI #2 (sDCI) 1205 are able to allocate, to one UE, PDSCH #1 and PDSCH #2 1210 and 1215 which are different from each other, by using information indicating time axis resource allocation 1220 and 1225, respectively. A UE performing NC-JT in a specific duration may assume that PDSCHs allocated by the mutually associated nDCI 1200 and sDCI 1205 have an overlapped duration 1230 of at least one OFDM symbol. As a representative example, in order to reduce the complexity of the UE, it may be promised that all DCI for allocation of PDSCH transmitted at the same time point has the same time axis resource allocation value. As another method for this, it is possible that the base station always pads, with a constant value, the time axis resource allocation information of sDCI, and the UE applies the time axis resource allocation value of nDCI to sDCI in the same manner.

One of possible restrictions on sDCI in case #1 is frequency axis resource allocation (frequency domain resource assignment). For example, if a BWP indicated in nDCI is configured to perform dynamic allocation on the frequency axis (frequency domain) (if both RA types 0 and 1 are configured via a higher layer), the RA type may be promised for the same indication. That is, MSB 1 bit of the frequency axis allocation information of the associated nDCI and sDCI is the same. This is to facilitate frequency axis interference assumption and management by the UE. For simpler UE operation, it can be promised that sDCI has the same frequency axis resource allocation value as that of nDCI, or PDSCH allocated by sDCI refers to the frequency axis resource allocation value of nDCI. In this case, a frequency axis resource allocation field of sDCI may be padded with specific bits.

One of possible restrictions on sDCI in case #1 is time axis VRB-to-PRB mapping. When the UE receives multiple PDSCHs at the same time, if VRB-to-PRB mapping for each PDSCH is different, it may be difficult to remove interference between layers or between codewords (CWs). Therefore, the associated nDCI and sDCI can be promised to have the same VRB-to-PRB mapping value, or it is possible to promise to apply a VRB-to-PRB mapping value of nDCI to all PDSCHs concurrently received regardless of a VRB-to-PRB mapping value of sDCI. In this case, VRB-to-PRB mapping of sDCI may be padded with specific bits.

One of possible restrictions on sDCI in case #1 is a PRB bundling size indicator. A PRB bundling size determines the precoding granularity of PDSCH and, therefore, when multiple PDSCHs are received at once, if the PRB bundling size for each PDSCH is different, the UE operation may be complicated. Therefore, the associated nDCI and sDCI can be promised to have the same PRB bundling size indicator value, or it is possible to promise to apply a PRB bundling size indicator value of nDCI to all PDSCHs concurrently received regardless of a PRB bundling size indicator value of sDCI. In this case, the PRB bundling size indicator of sDCI may be padded with specific bits.

One of possible restrictions on sDCI in case #1 is CBG-related information, such as CBG transmission information and CBG flushing out information. CBG-related DCI indicators are indicators related to partial retransmission within one slot, and for simplification of UE operation, the associated nDCI and sDCI are promised to have the same CBG-related DCI indicators, or it is possible to promise that the UE applies CBG-related DCI indicator values of nDCI to all PDSCHs concurrently received regardless of the CBG-related DCI indicator value of sDCI. In this case, the CBG-related DCI indicators of sDCI may be padded with specific bits.

In case #2, as described in the first embodiment, the control information sDCI for PDSCH transmitted in the coordinated TRPs can be transmitted in an abbreviated form compared to nDCI. For example, sDCI can be transmitted via the same type DCI format as that of nDCI, for example, DCI format 1_1, but may include only a part of nDCI information. The UE can apply the same value as that transmitted in nDCI, to information, which is not included in sDCI, in information required for reception of an additional PDSCH transmitted in the coordinated TRPs. For detailed descriptions of the nDCI and sDCI, refer to the description in case #1.

In case #2, it may be assumed that the UE receives at least one piece of the following information when receiving sDCI for NC-JT:

Identifier for DCI formats (1 bit): A DL or UL DCI format indicator which always needs to be configured to 1 even in sDCI.

Rate matching indicator (0 or 1 or 2 bits): Indicating a rate matching pattern, wherein, when a different rate matching pattern is required for each TRP, a rate matching indicator may be included in sDCI for independent indication for each PDSCH Modulation and coding scheme (5 bits): A modulation and coding scheme may be included in sDCI for independent MCS allocation for each PDSCH in consideration of a different channel quality for each TRP. In order to reduce a UE complexity, it is possible to promise to include only one MCS indicator in one piece of nDCI or sDCI when NC-JT is applied. This indicates that, when NC-JT is applied (because one MCS indicator corresponds to one codeword), the maximum number of layers that can be allocated by one piece of nDCI or sDCI is limited, and the limited maximum number of layers may be one of 1, 2, or 4.

New data indicator (1 bits): A new data indicator may be included in sDCI for independent initial transmission and retransmission indication for each PDSCH in consideration of a different channel quality for each TRP. In order to reduce a UE complexity, it is possible to promise to include only one NDI indicator in one piece of nDCI or sDCI when NC-JT is applied. This indicates that, when NC-JT is applied (because one NDI indicator corresponds to one codeword), the maximum number of layers that can be allocated by one piece of nDCI or sDCI is limited, and the limited maximum number of layers may be one of 1, 2, or 4.

Redundancy version (2 bits): A redundancy version may be included in sDCI for an independent redundant version indication for each PDSCH in consideration of a different channel quality for each TRP. In order to reduce a UE complexity, it is possible to promise to include only one RV indicator in one piece of nDCI or sDCI when NC-JT is applied. This indicates that, when NC-JT is applied (because one RV indicator corresponds to one codeword), the maximum number of layers that can be allocated by one piece of nDCI or sDCI is limited, and the limited maximum number of layers may be one of 1, 2, or 4.

HARQ process number: If the UE allows independent HARQ process allocation to PDSCHs that need to be concurrently received, an HARQ process number may be included in sDCI.

DL assignment index (0, 2, or 4 bits): DAI indicator

Antenna port (4 or 5 or 6 bits): Configuring a different DMRS port for each TPR, wherein an antenna port is independently indicated in sDCI, for an appropriate configuration of "a DMRS CDM group without data"

Transmission configuration indication: Independently indicated in sDCI, to indicate a different QCL relationship for each TPR DMRS sequence initialization: Independently indicated in sDCI, to indicate a different scrambling ID for each TPR Reserved bits: Information payload, which is included in nDCI but not included in sDCI to reduce a blind decoding complexity of the UE and improve the reception performance of sDCI, is determined as reserved bits, and a predetermined bit sequence may be padded.

In case #3, as described in the first embodiment, control information for multiple PDSCHs transmitted in multiple coordinated TRPs may be aggregated in one piece of sDCI so as to be transmitted. For example, sDCI may include pairs (or a set including a part of multiple information) of some information of nDCI information in a DCI format separate from nDCI, and each pair refers to a part of the control information for PDSCH transmitted in each coordinated TRP. The UE can apply the same value as that transmitted in nDCI, to information, which is not included in sDCI, in information required for reception of an additional PDSCH transmitted in the coordinated TRPs. For detailed descriptions of the nDCI and sDCI, refer to the description in case #1.

In case #3, if one serving TRP and (N−1) coordinated TRPs separately transmit PDSCH for NC-JT, it may be assumed that the UE receives at least one piece of the following information upon reception of sDCI:

1 identifier for DCI formats (1 bit): A DL or UL DCI format indicator which always needs to be configured to 1 even in sDCI (N−1) rate matching indicators (0 or 1 or 2 bits): Indicating a rate matching pattern, wherein, when a different rate matching pattern is required for each TRP, a rate matching indicator may be included in sDCI for independent indication (N−1) modulation and coding schemes (5 bits): Modulation and coding schemes may be included in sDCI for independent MCS allocation for each PDSCH in consideration of a different channel quality for each TRP. In order to reduce a UE complexity, it is possible to promise to include only one MCS indicator in one piece of nDCI or sDCI when NC-JT is applied. This indicates that, when NC-JT is applied, the maximum number of layers that can be allocated by one piece of nDCI or sDCI is limited, and the limited maximum number of layers may be one of 1, 2, or 4.

(N−1) new data indicators (1 bits): New data indicators may be included in sDCI for independent initial transmission and retransmission indication for each PDSCH in consideration of a different channel quality for each TRP. In order to reduce a UE complexity, it is possible to promise to include only one NDI indicator in one piece of nDCI or sDCI when NC-JT is applied. This indicates that, when NC-JT is applied, the maximum number of layers that can be allocated by one piece of nDCI or sDCI is limited, and the limited maximum number of layers may be one of 1, 2, or 4.

(N−1) redundancy versions (2 bits): Redundancy versions may be included in sDCI for an independent redundant version indication for each PDSCH in consideration of a different channel quality for each TRP. In order to reduce a UE complexity, it is possible to promise to include only one RV indicator in one piece of nDCI or sDCI when NC-JT is applied. This indicates that, when NC-JT is applied, the maximum number of layers that can be allocated by one piece of nDCI or sDCI is limited, and the limited maximum number of layers may be one of 1, 2, or 4.

(N−1) HARQ process numbers: If the UE allows independent HARQ process allocation to PDSCHs that need to be concurrently received, HARQ process numbers may be included in sDCI.

(N−1) DL assignment indices (0, 2, or 4 bits): DAI indicator (N−1) antenna ports (4 or 5 or 6 bits): Configuring a different DMRS port for each TPR, wherein antenna ports are independently indicated in sDCI, for an appropriate configuration of "a DMRS CDM group without data"

(N−1) transmission configuration indications: Independently indicated in sDCI, to indicate a different QCL relationship for each TPR (N−1) DMRS sequence initialization: Independently indicated in sDCI, to indicate a different scrambling DMRS ID for each TPR.

Reserved bits: In order to reduce a blind decoding complexity of the UE and improve the reception performance of sDCI, if an sDCI payload is smaller than an nDCI payload, the number of bits, which corresponds to the difference, may be determined as reserved bits, and a determined bit sequence may be padded.

In the following embodiments, methods for determining sDCI reception validity by the UE are provided. The following embodiments are not limited to one of cases #1, #2, or #3, and can be commonly applied by similar methods.

Third Embodiment

The embodiment provides a first sDCI validation method for a case in which a CRC of sDCI received by the UE is scrambled with a CS-RNTI.

When NC-JT via sDCI is supported, a false alarm or miss detection for sDCI reception causes the UE to assume erroneous interference, causes loss of data transmitted in the coordinated TRPs, and therefore may adversely affect network throughput. Therefore, it is important to provide a device that allows the UE to determine the validity of sDCI reception (sDCI validation).

Procedures of determining the validity of sDCI reception mainly include two procedures of: 1) determining an sDCI validity determination initiation condition (or a starting condition); and 2) performing the sDCI validity determination.

If the CRC of sDCI is scrambled with CS-RNTI, it is possible to use one of the following two methods as a condition for initiating sDCI validity determination:

According to a first method, a condition for initiating sDCI validity determination according to an NDI field value of sDCI is as follows. If the UE promises to start sDCI validity determination according to the NDI field value of sDCI, the sDCI validity determination needs to be distinguished from a conventional DL semi-persistent scheduling (SPS) validity determination or UL grant type 2 validity determination.

Figure 13:
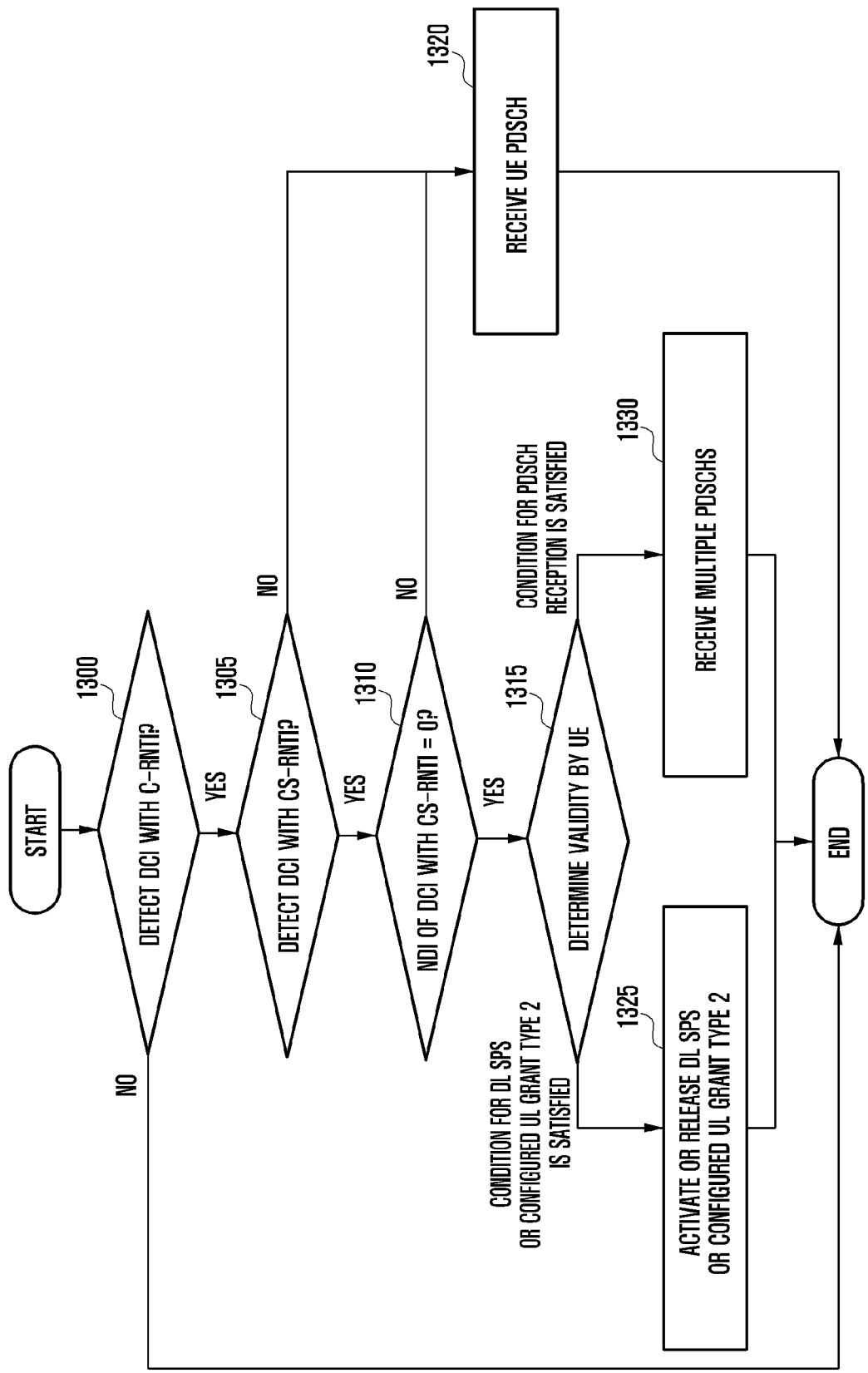
FIG. 13 is a diagram illustrating a method of determining the validity of sDCI by a UE, for coordinated transmission according to the disclosure when a CRC of the sDCI is scrambled with a CS-RNTI.

FIG. 13 is a diagram illustrating a UE operation of performing sDCI validity determination according to an NDI field value of sDCI if a CRC of sDCI is scrambled with a CS-RNTI. Referring to FIG. 13, a UE receives DCI (hereinafter, DL grant DCI with C-RNTI) for scheduling (for DL grant) PDSCH scrambled with C-RNTI so as to obtain allocation information for a first PDSCH, in 1300. Thereafter, the UE attempts, in 1305, to detect DCI (hereinafter, DL grant DCI with CS-RNTI) for scheduling (for DL grant) PDSCH scrambled with CS-RNTI, receives, in 1320, a single PDSCH allocated by the DL grant DCI with C-RNTI if the detection fails, and checks, in 1310, an NDI field value in the detected DL grant DCI with CS-RNTI if the detection is successful.

If the checked NDI field value is 1, the UE determines the DL grant DCI with CS-RNTI as DCI for DL SPS retransmission and receives a single PDSCH allocated according thereto, in 1320. If the checked NDI field value is 0, the UE starts to determine UE validity for the "DL grant DCI with CS-RNTF", in 1315. That is, if DCI is scrambled with CS-RNTI and the value of the NDI field is 0, it may be acknowledge that the validity determination initiation condition is satisfied.

If some information in the DL grant DCI with CS-RNTI satisfies conditions in Table 5 or Table 6, the UE confirms, in 1325, that the DL grant DCI with CS-RNTI is DCI for activation/release of DL SPS or UL grant type 2. On the other hand, if some information in the DL grant DCI with CS-RNTI satisfies the condition in Table 7, the UE confirms that the DL grant DCI with CS-RNTI is sDCI for NC-JT, and receives multiple PDSCHs according to the sDCI, in 1330. If all of the above validity determinations fail (if validation is not achieved), the UE determines that the sDCI is detected with a non-matching CRC (that is, the sDCI is disregarded).

Table 7 above is an example for description of the embodiment, and when actually applied, the contents of Table 7 do not overlap with the validity determination for activation and release of DL SPS or UL grant type 2, and it is obvious that the contents of Table 7 can be appropriately replaced with other padding values or other information that can be omitted from sDCI. In the specification, in order not to obscure the gist of the disclosure, listing all information combinations and padding values that can be used for sDCI validity determination, other than those in Table 7, is omitted.

TABLE 5

|  | DCI format 0_0/0_1 | DCI format 1_0 | DCI format 1_1 |
|---|---|---|---|
| HARQ process number | set to all "0"s | set to all '0's | set to all "0"s |
| Redundancy version | set to "00" | set to '00' | For the enabled transport block: set to "00" |

TABLE 6

|  | DCI format 0_0 | DCI format 1_0 |
|---|---|---|
| HARQ process number | set to all "0"s | set to all "0"s |
| Redundancy version | set to "00" | set to "00" |
| Modulation and coding scheme | set to all "1"s | set to all "1"s |
| Resource block assignment | set to all "1"s | set to all "1"s |

TABLE 7

|  | DCI format 1_0 | DCI format 1_1 |
|---|---|---|
| Time domain resource assignment | set to all "0"s | set to all "0"s |
| Bandwidth part indicator | set to all "0"s | set to all "0"s |
| VRB-to-PRB mapping | set to all "0"s | set to all "0"s |
| PRB bundling size indicator | set to all "0"s | set to all "0"s |

A second condition of initiating sDCI validity determination according to a frequency axis or time axis resource allocation value of sDCI is as follows. For another method for the UE to determine starting of sDCI validity determination for NC-JT, a frequency axis or time axis resource allocation value of sDCI can be used. For example, in the NC-JT, it is possible to start sDCI validity determination by a time axis resource allocation value of sDCI, on the basis of the fact that time axis resource allocation values of nDCI and sDCI for allocation of different PDSCHs should indicate at least one same OFDM symbol (i.e., the same time point).

Figure 14:
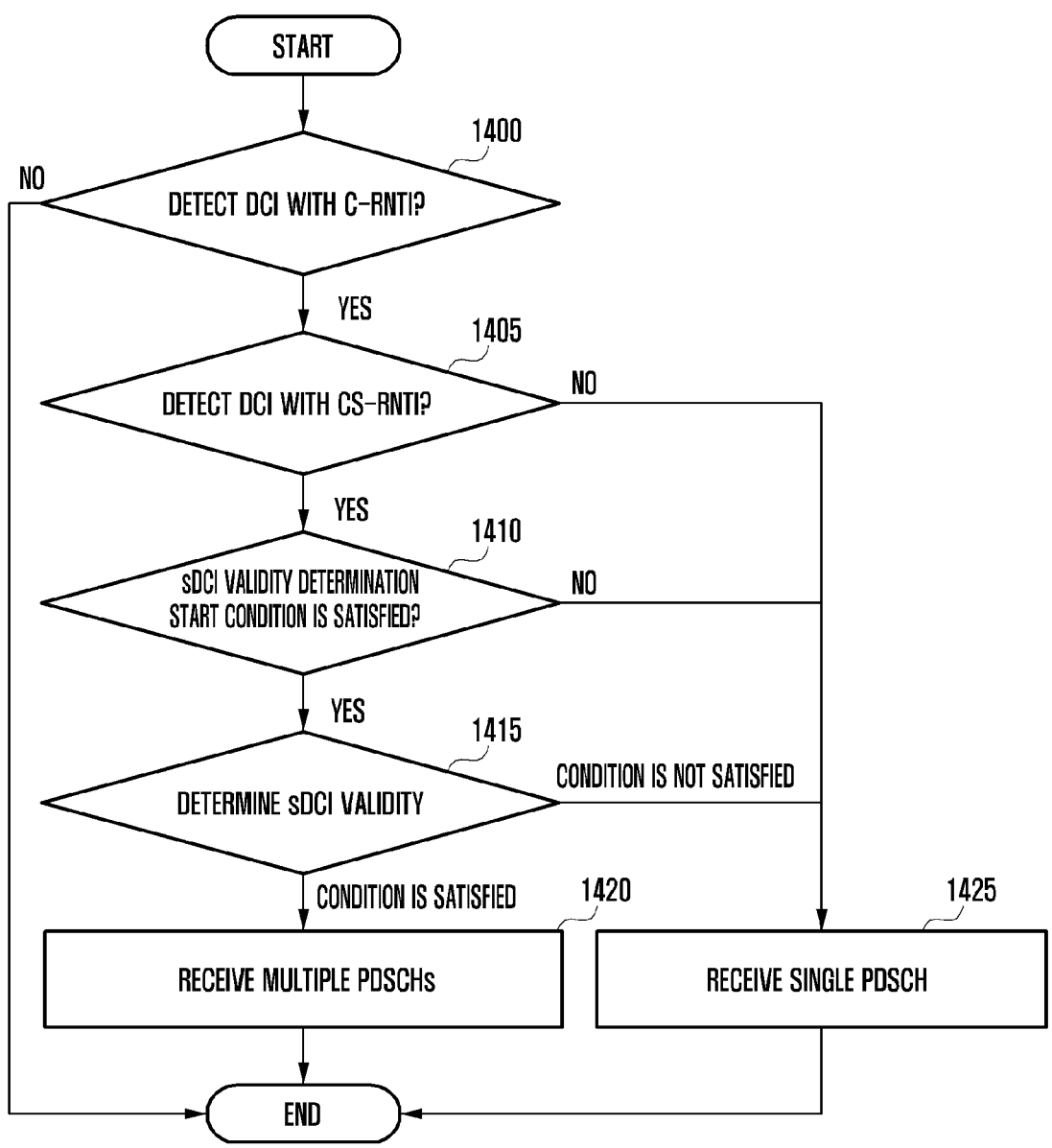
FIG. 14 is a diagram illustrating another method of determining the validity of sDCI by a UE, for coordinated transmission according to the disclosure when a CRC of the sDCI is scrambled with a SC-RNTI.

FIG. 14 is a diagram illustrating a UE operation of performing sDCI validity determination according to a time axis resource allocation value of sDCI if a CRC of sDCI is scrambled with a CS-RNTI. Referring to FIG. 14, a UE receives a DL grant DCI with C-RNTI and obtains allocation information for a first PDSCH, in 1400. Thereafter, the UE attempts to detect, in 1405, the DL grant DCI with CS-RNTI, and if the detection fails, the UE receives, in 1425, a single PDSCH allocated by the DL grant DCI with C-RNTI. If the UE succeeds in the detection, the UE checks a time axis resource allocation value in the detected DL grant DCI with CS-RNTI, and determines, in 1410, whether a condition for starting sDCI validity determination is satisfied.

For the condition of starting sDCI validity determination, one of the following examples can be used. 1) If a time axis resource allocation of sDCI and a time axis resource allocation of nDCI indicate at least one identical OFDM symbol, and 2) If OFDM symbol positions indicated by both the time axis resource allocation of sDCI and the time axis resource allocation of nDCI match. If the time axis resource allocation in the DL grant DCI with CS-RNTI does not satisfy the above condition, the UE determines that there is no valid sDCI and receives a single PDSCH allocated by nDCI in 1425.

If the time axis resource allocation in the DL grant DCI with CS-RNTI satisfies the condition, the UE determines, in 1415, whether other information in the DL grant DCI with CS-RNTI satisfies the defined validity determination condition. For example, if some information in the DL grant DCI with CS-RNTI satisfies conditions in Table 8, the UE confirms that the DL grant DCI with CS-RNTI is sDCI for NC-JT and receives multiple PDSCHs in 1420. If the above validity determinations fail (if validation is not achieved), the UE determines that the sDCI is detected with a non-matching CRC (that is, the sDCI is disregarded).

Table 8 is an example for description of the embodiment, and when actually applied, it is obvious that the contents of Table 8 can be appropriately replaced with other padding values or other information that can be omitted from sDCI, for example, as shown in Table 9. In the specification, in order not to obscure the gist of the disclosure, listing all information combinations and padding values that can be used for sDCI validity determination, other than those in Table 8, is omitted. In particular, a method based on frequency axis resource allocation other than the described time axis resource allocation-based sDCI validity determination time condition (in this case, as an example, if the frequency axis resource allocations of nDCI and sDCI indicate at least one identical RB, or indicate identical RBs, the UE may perform validity determination for sDCI), a method based on both the time axis and frequency axis resource allocations, or the like can be applied in a manner similar to the above description.

TABLE 8

|  | DCI format 1_0 | DCI format 1_1 |
|---|---|---|
| Bandwidth part indicator | set to all "0"s | set to all "0"s |
| VRB-to-PRB mapping | set to all "0"s | set to all "0"s |
| PRB bundling size indicator | set to all "0"s | set to all "0"s |

TABLE 9

|  | DCI format 1_0 | DCI format 1_1 |
|---|---|---|
| BWP indicator | set to all "0"s | set to all "0"s |
| CBG transmission info. | set to all "0"s | set to all "0"s |
| CBG flushing out info. | set to all "0"s | set to all "0"s |
| ... | ... | ... |

Fourth Embodiment

The embodiment provides a method for sDCI validity determination for a case in which CRC of sDCI received by the UE is scrambled with C-RNTI.

When NC-JT via sDCI is supported, a false alarm or miss detection for sDCI reception causes the UE to assume erroneous interference, causes loss of data transmitted in the coordinated TRPs, and therefore may adversely affect network throughput. Therefore, it is important to provide a device that allows the UE to determine the validity of sDCI reception (sDCI validation).

Procedures of determining the validity of sDCI reception mainly include two procedures of: 1) determining an sDCI validity determination initiation condition (or a starting condition); and 2) performing the sDCI validity determination.

If the CRC of sDCI for NC-JT is scrambled with C-RNTI, the UE may determine nDCI for allocation of a first PDSCH transmitted in the serving TRP, according to one of the following conditions. 1) A case where DCI (hereinafter, DL grant DCI with C-RNTI) scrambled with multiple C-RNTIs allocating multiple PDSCHs to one OFDM symbol is detected, DCI detected in a PDCCH candidate position of a lowest index, an earliest (UE-specific) search space within a corresponding slot, a (UE-specific) search space of a lowest (or highest) search space ID, or CORESET (excluding common CORESET) of a lowest (or highest) CORESET ID, and 2) a case where an indicator indicating serving TRP DCI, primary DCI, first DCI, or the like is included in DCI and designated as nDCI.

Figure 15:
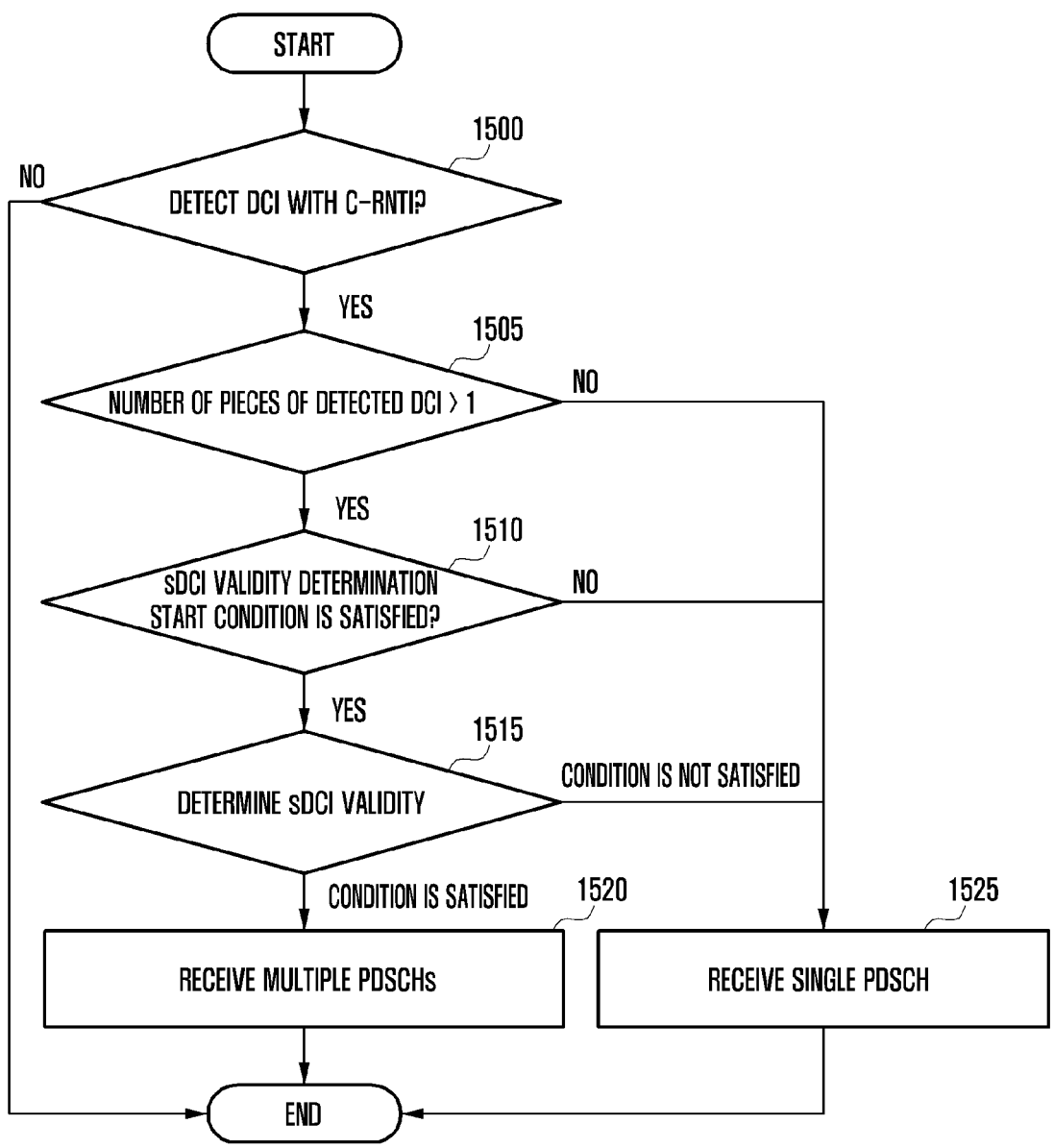
FIG. 15 is a diagram illustrating a method of PDSCH reception by a UE, for coordinated transmission according to the disclosure when a CRC of sDCI is scrambled with a CS-RNTI.

FIG. 15 is a diagram illustrating a procedure of PDSCH reception by a UE when a CRC of sDCI for NC-JT is scrambled with a C-RNTI and multiple pieces of DL grant DCI with C-RNTI allocating multiple PDSCHs to one OFDM symbol is detected. Referring to FIG. 15, a UE attempts, in 1500, to detect DL grant DCI with C-RNTI, and determines, in 1505, whether the number of pieces of DL grant DCI with C-RNTI allocating PDSCH within one slot is more than 1. If there is one piece of DL grant DCI with C-RNTI allocating PDSCH in one slot, the UE receives, in 1525, a single PDSCH allocated by corresponding DCI. On the other hand, if there is more than one piece of DL grant DCI with C-RNTI allocating PDSCH in one slot, the UE determines, in 1510, whether a condition for sDCI validity determination is satisfied. For example, if nDCI is determined according to the described nDCI determination criteria, the UE may determine starting of sDCI validity determination according to whether time axis resource allocation of sDCI (DL grant DCI with C-RNTI other than nDCI) indicates the same OFDM symbol (at least one) as that of time axis resource allocation of nDCI. If the sDCI validity determination start condition is not satisfied, the UE receives, in 1525, a single PDSCH allocated by nDCI.

On the other hand, if the sDCI validity determination start condition is satisfied, the UE determines, in 1515, whether other information in corresponding "DL grant DCI with C-RNTI" satisfies the defined validity determination condition. For example, if some information in the DL grant DCI with C-RNTI other than nDCI satisfies the conditions in Table 8, the UE confirms that the DL grant DCI with C-RNTI is sDCI for NC-JT and receives multiple PDSCHs in 1520. If the above validity determinations fail (if validation is not achieved), the UE determines that the sDCI is detected with a non-matching CRC (that is, the sDCI is disregarded).

Table 8 is an example for description of the embodiment, and when actually applied, it is obvious that the contents of Table 8 can be appropriately replaced with other padding values or other information that can be omitted from sDCI, for example, as shown in Table 9. In the specification, in order not to obscure the gist of the disclosure, listing all information combinations and padding values that can be used for sDCI validity determination, other than those in Table 8, is omitted. In particular, a method based on frequency axis resource allocation other than the described time axis resource allocation-based sDCI validity determination, a method based on both the time axis and frequency axis resource allocations, or the like can be applied in a manner similar to the above description.

Fifth Embodiment

The embodiment provides a method for sDCI validity determination for a case in which a CRC of sDCI received by the UE is scrambled with a new RNTI (hereinafter, newRNTI).

When NC-JT via sDCI is supported, a false alarm or miss detection for sDCI reception causes the UE to assume erroneous interference, causes loss of data transmitted in the coordinated TRPs, and therefore may adversely affect network throughput. Therefore, it is important to provide a device that allows the UE to determine the validity of sDCI reception (sDCI validation).

Procedures of determining the validity of sDCI reception mainly include two procedures of: 1) determining an sDCI validity determination initiation condition (or a starting condition); and 2) performing the sDCI validity determination.

If the CRC of sDCI for NC-JT is scrambled with newRNTI, the UE may determine nDCI for allocation of a first PDSCH transmitted in the serving TRP, according to one of the following conditions. 1) DL grant DCI with C-RNTI allocating an OFDM symbol to the same position as an OFDM symbol (at least one) allocated by sDCI, and 2) a case where an indicator indicating the serving TRP DCI, primary DCI, first DCI, or the like is included in DCI and designated.

The newRNTI is an example of an RNTI name for sDCI scrambling, and may be referred to as various names, such as NCJT-RNTI, CoMP-RNTI, and multiple (MP) PDSCH-RNTI, when actually applied.

Figure 16:
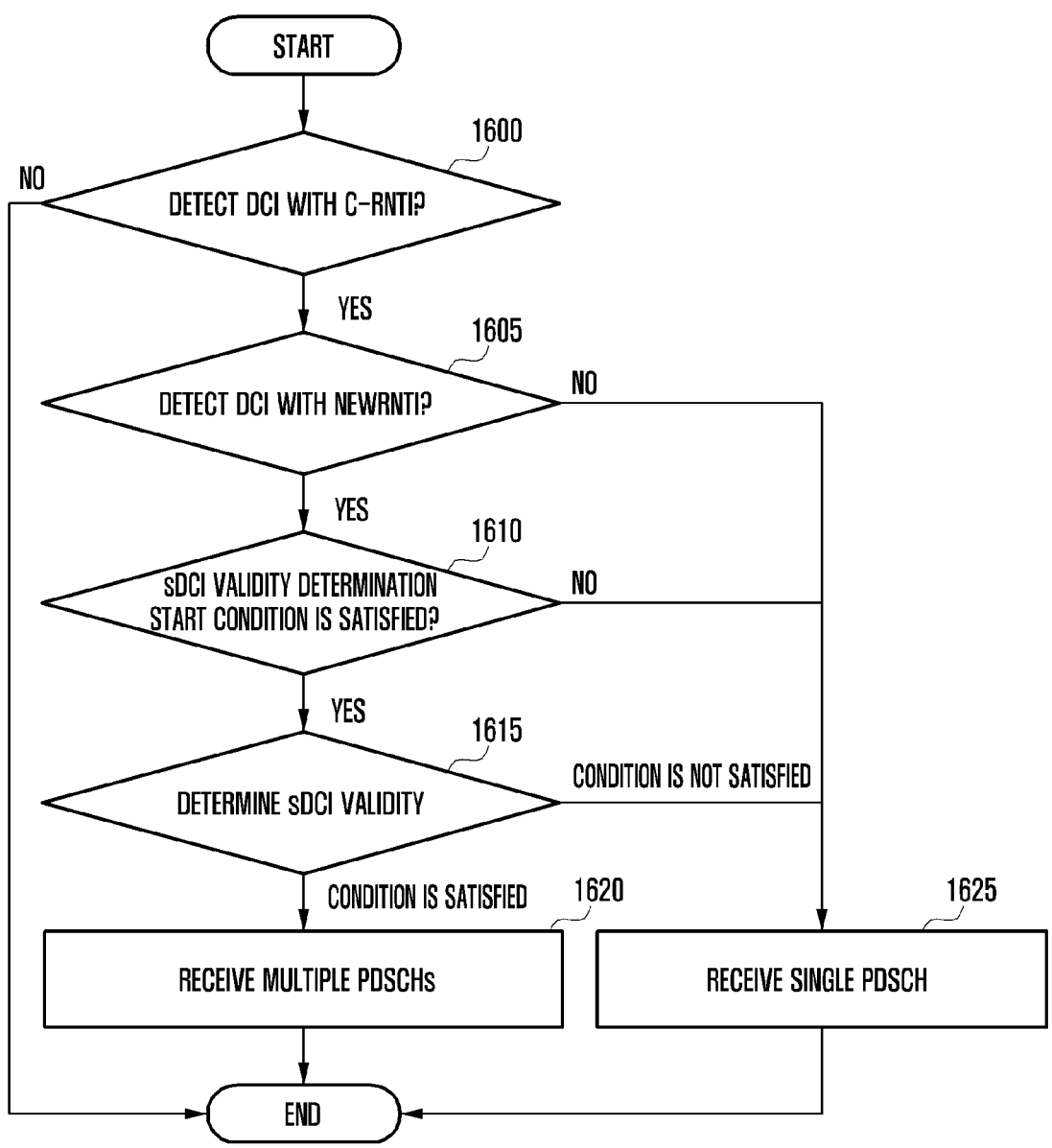
FIG. 16 is a diagram illustrating a method of PDSCH reception by a UE, for coordinated transmission according to the disclosure when a CRC of sDCI is scrambled with a new RNTI.

FIG. 16 is a diagram illustrating a PDSCH reception operation of a UE when a CRC of sDCI for NC-JT is scrambled with newRNTI. Referring to FIG. 16, a UE attempts, in 1600, to detect DL grant DCI with C-RNTI, and if the detection is successful, the UE attempts, in 1605, to detect DCI (hereinafter, DL grant DCI with newRNTI) for scheduling (for DL grant) of PDSCH scrambled with newRNTI. If DL grant DCI with newRNTI is not detected, the UE receives, in 1625, a single PDSCH allocated by the DL grant DCI with C-RNTI (or nDCI). If DL grant DCI with newRNTI is detected, the UE determines, in 1610, whether a condition for sDCI validity determination is satisfied. For example, if nDCI is determined according to the described nDCI determination criteria, the UE may determine starting of sDCI validity determination according to whether time axis resource allocation of sDCI (DL grant DCI with newRNTI) indicates the same OFDM symbol (at least one) as that of time axis resource allocation of nDCI. If the sDCI validity determination start condition is not satisfied, the UE receives, in 1625, a single PDSCH allocated by nDCI.

On the other hand, if the sDCI validity determination start condition is satisfied, the UE determines, in 1615, whether other information in the "DL grant DCI with newRNTI" satisfies the defined validity determination condition. For example, if some information in the DL grant DCI with newRNTI satisfies conditions in Table 8, the UE confirms that the DL grant DCI with newRNTI is sDCI for NC-JT and receives multiple PDSCHs in 1620. If the above validity determinations fail (if validation is not achieved), the UE determines that the sDCI is detected with a non-matching CRC (that is, the sDCI is disregarded).

Table 8 is an example for description of the embodiment, and when actually applied, it is obvious that the contents of Table 8 can be appropriately replaced with other padding values or other information that can be omitted from sDCI, for example, as shown in Table 9. In the specification, in order not to obscure the gist of the disclosure, listing all information combinations and padding values that can be used for sDCI validity determination, other than those in Table 8, is omitted. In particular, a method based on frequency axis resource allocation other than the described time axis resource allocation-based sDCI validity determination, a method based on both the time domain(axis) and frequency axis resource allocations, or the like can be applied in a manner similar to the above description.

Figure 17:
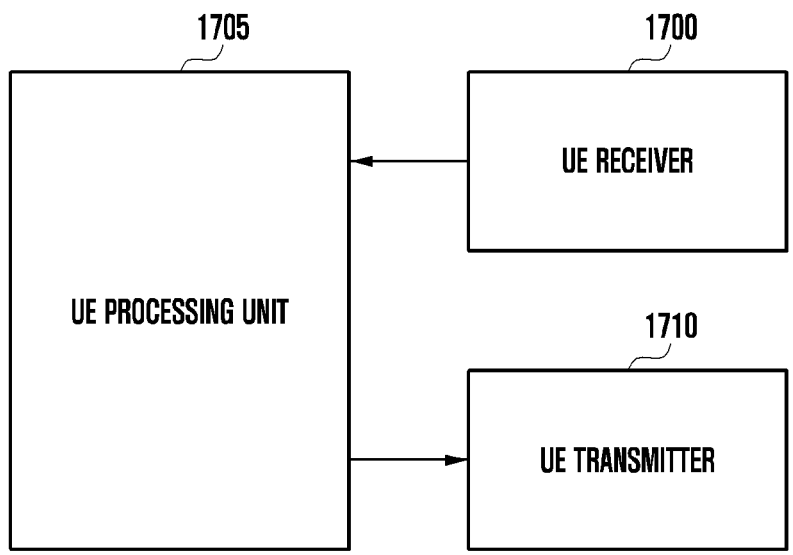
FIG. 17 is a diagram illustrating a UE structure according to the disclosure.

FIG. 17 is a block diagram illustrating a structure of a UE according to the disclosure.

Referring to FIG. 17, the UE may include transceivers 1700 and 1710, a memory, and a processing unit 1705 including a processor. According to the embodiment described above, the transceivers 1700 and 1710 and the processing unit 1705 of the UE may operate. However, the elements of the UE are not limited to the above examples. For example, the UE may include more or fewer elements compared to the above-described elements. In addition, the transceivers 1700 and 1710 and the processing unit 1705 may be implemented in the form of a single chip.

The transceivers 1700 and 1710 may transmit a signal to or receive a signal from a base station. Here, the signal may include control information and data. To this end, the transceiver 1700, 1710 may include an RF transmitter configured to perform up-conversion and amplification of a frequency of a transmitted signal, an RF receiver configured to perform low-noise amplification of a received signal and perform down-conversion of a frequency, and the like. However, this is merely an embodiment of the transceiver 1700 and 1710, and elements of the transceiver 1700 and 1710 are not limited to the RF transmitter and the RF receiver. Further, the transceiver 1700 and 1710 may receive a signal via a radio channel, may output the signal to the processor 1705, and may transmit the signal output from the processor 1705, via the radio channel.

The processing unit 1705 may store programs and data necessary for an operation of the UE. The processing unit 1705 may store control information or data included in a signal obtained by the UE. The processing unit 1705 may include a storage medium, such as a ROM, a RAM, a hard disk, a CD-ROM, and a DVD, or a memory including a combination of storage media.

The processing unit 1705 may control a series of procedures so that the UE can operate according to the above-described embodiment. According to an embodiment, the processing unit 1705 may receive multiple pieces of DCIs to concurrently receive multiple PDSCHs, and in particular, may control an element of the UE so as to perform a validity check on a part of DCI.

Figure 18:
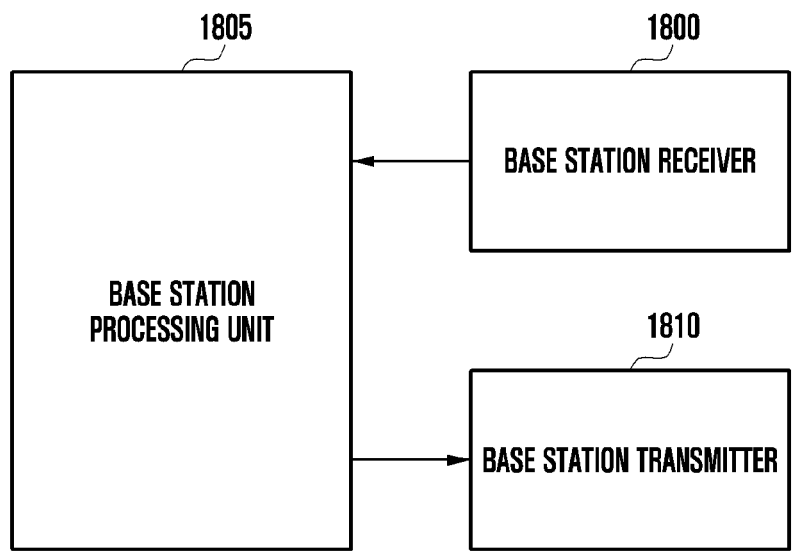
FIG. 18 is a diagram illustrating a base station structure according to the disclosure.

FIG. 18 is a block diagram illustrating a structure of a base station according to the disclosure.

Referring to FIG. 18, the base station may include transceivers 1800 and 1810, a memory, and a processing unit 1805 including a processor. According to the above-described communication method of the base station, the transceivers 1800 and 1810 and the processing unit 1805 of the base station may operate. However, elements of the base station are not limited to the above examples. For example, the base station may include more or fewer elements compared to the above-described elements. In addition, the transceivers 1800 and 1810 and the processing unit 1805 may be implemented in the form of a single chip.

The transceivers 1800 and 1810 may transmit a signal to or receive a signal from a UE. Here, the signal may include control information and data. To this end, the transceiver 1800, 1810 may include an RF transmitter configured to perform up-conversion and amplification of a frequency of a transmitted signal, an RF receiver configured to perform low-noise amplification of a received signal and perform down-conversion of a frequency, and the like. However, this is merely an embodiment of the transceiver 1800 and 1810, and elements of the transceiver 1800 and 1810 are not limited to the RF transmitter and the RF receiver. Further, the transceiver 1800 and 1810 may receive a signal via a radio channel, may output the signal to the processor 1805, and may transmit the signal output from the processor 1805, via the radio channel.

The processing unit 1805 may store programs and data necessary for an operation of the base station. The processing unit 1805 may store control information or data included in a signal obtained by the base station. The processing unit 1805 may include a storage medium, such as a ROM, a RAM, a hard disk, a CD-ROM, and a DVD, or a memory including a combination of storage media.

The processing unit 1805 may control a series of procedures so that the base station can operate according to the above-described embodiment. According to the disclosure, the processing unit 1805 may generate DCI including at least one of nDCI or sDCI in order to configure data transmission using multiple TRPs to a UE, may transmit the generated DCI to the UE by using the transceivers 1800 and 1810, and may control each element of the base station to transmit PDSCH to the UE by using multiple TRPs.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical idea of the disclosure. Further, the above respective embodiments may be employed in combination, as necessary. For example, embodiments 1 to 5 of the disclosure may be partially combined to operate a base station and a terminal.

The invention claimed is:

1. A method of a terminal in a wireless communication system, the method comprising:
 identifying a first identifier of a control resource set (CORESET) and a second identifier of the CORESET;
 receiving, from a first transmission and reception point (TRP), first downlink control information (DCI) for scheduling of a first physical downlink shared channel (PDSCH), wherein the first DCI is associated with the first identifier of a CORESET, and the CORESET of the first identifier is for the first TRP;
 receiving, from a second TRP, second DCI for scheduling of a second PDSCH, wherein the second DCI is associated with the second identifier of a CORESET, and the CORESET of the second identifier is for the second TRP;
 identifying whether the first PDSCH and the second PDSCH are allocated to a same bandwidth part (BWP) or not; and
 receiving the first PDSCH and the second PDSCH in case that the first PDSCH and the second PDSCH are allocated to the same BWP,
 wherein the first PDSCH and the second PDSCH are fully or partially overlapped in a time domain.

2. The method of claim 1, further comprising:
 skipping a reception of the second PDSCH in case that the first PDSCH and the second PDSCH are not allocated to the same BWP.

3. The method of claim 1, wherein the first DCI and the second DCI correspond to full scheduling information.

4. The method of claim 1, wherein the first DCI and the second DCI include a first hybrid automatic repeat request (HARQ) process identifier and a second HARQ process identifier, respectively, and wherein the first HARQ process identifier and the second HARQ identifier indicate different values.

5. A method of a base station in a wireless communication system, the method comprising:
 identifying a first identifier of a control resource set (CORESET) and a second identifier of the CORESET;
 transmitting, via a first transmission and reception point (TRP) to a terminal, first downlink control information (DCI) for scheduling of a first physical downlink shared channel (PDSCH), wherein the first DCI is associated with the first identifier of a CORESET, and the CORESET of the first identifier is for the first TRP;
 transmitting, via a second TRP to the terminal, second DCI for scheduling of a second PDSCH, wherein the second DCI is associated with the second identifier of a CORESET, and the CORESET of the second identifier is for the second TRP; and
 transmitting, to the terminal, the first PDSCH and the second PDSCH,
 wherein the first PDSCH and the second PDSCH are allocated to a same bandwidth part (BWP), and
 wherein the first PDSCH and the second PDSCH are fully or partially overlapped in a time domain.

6. The method of claim 5, wherein the first DCI and the second DCI correspond to full scheduling information.

7. The method of claim 5, wherein the first DCI and the second DCI include a first hybrid automatic repeat request (HARQ) process identifier and a second HARQ process identifier, respectively, and
 wherein the first HARQ process identifier and the second HARQ identifier indicate different values.

8. A terminal in a wireless communication system, the terminal comprising:
 a transceiver; and
 a controller coupled with the transceiver and configured to:
 identify a first identifier of a control resource set (CORESET) and a second identifier of the CORESET,
 receive, from a first transmission and reception point (TRP), first downlink control information (DCI) for scheduling of a first physical downlink shared channel (PDSCH), wherein the first DCI is associated with the first identifier of a CORESET, and the CORESET of the first identifier is for the first TRP,
 receive, from a second TRP, second DCI for scheduling of a second PDSCH, wherein the second DCI is associated with the second identifier of a CORESET, and the CORESET of the second identifier is for the second TRP,
 identify whether the first PDSCH and the second PDSCH are allocated to a same bandwidth part (BWP) or not, and
 receive the first PDSCH and the second PDSCH in case that the first PDSCH and the second PDSCH are allocated to the same BWP,
 wherein the first PDSCH and the second PDSCH are fully or partially overlapped in a time domain.

9. The terminal of claim 8, wherein the controller is further configured to skip a reception of the second PDSCH in case that the first PDSCH and the second PDSCH are not allocated to the same BWP.

10. The terminal of claim 8, wherein the first DCI and the second DCI correspond to full scheduling information.

11. The terminal of claim 8, wherein the first DCI and the second DCI include a first hybrid automatic repeat request (HARQ) process identifier and a second HARQ process identifier, respectively, and
 wherein the first HARQ process identifier and the second HARQ identifier indicate different values.

12. A base station in a wireless communication system, the base station comprising:
 a transceiver; and
 a controller coupled with the transceiver and configured to:
 identify a first identifier of a control resource set (CORESET) and a second identifier of the CORESET, transmit, via a first transmission and reception point (TRP) to a terminal, first downlink control information (DCI) for scheduling of a first physical downlink shared channel (PDSCH), wherein the first DCI is associated with the first identifier of a CORESET, and the CORESET of the first identifier is for the first TRP, transmit, via a second TRP to the terminal, second DCI for scheduling of a second PDSCH, wherein the second DCI is associated with the second identifier of a CORE-SET, and the CORESET of the second identifier is for the second TRP, and transmit, to the terminal, the first PDSCH and the second PDSCH, wherein the first PDSCH and the second PDSCH are allocated to a same bandwidth part (BWP), and wherein the first PDSCH and the second PDSCH are fully or partially overlapped in a time domain.

13. The base station of claim 12 wherein the first DCI and the second DCI correspond to full scheduling information.

14. The base station of claim 12, wherein the first DCI and the second DCI include a first hybrid automatic repeat request (HARQ) process identifier and a second HARQ process identifier, respectively, and wherein the first HARQ process identifier and the second HARQ identifier indicate different values.

15. The method of claim 4, wherein the first DCI and the second DCI include first time resource allocation information and second time resource allocation information, respectively, and wherein a first resource corresponding to the first time resource allocation information and a second resource corresponding to the second time resource allocation information overlap each other in at least one symbol.

16. The method of claim 7, wherein the first DCI and the second DCI include first time resource allocation information and second time resource allocation information, respectively, and wherein a first resource corresponding to the first time resource allocation information and a second resource corresponding to the second time resource allocation information overlap each other in at least one symbol.

17. The terminal of claim 11, the first DCI and the second DCI include first time resource allocation information and second time resource allocation information, respectively, and wherein a first resource corresponding to the first time resource allocation information and a second resource corresponding to the second time resource allocation information overlap each other in at least one symbol.

18. The base station of claim 14, wherein the first DCI and the second DCI include first time resource allocation information and second time resource allocation information, respectively, and wherein a first resource corresponding to the first time resource allocation information and a second resource corresponding to the second time resource allocation information overlap each other in at least one symbol.

* * * * *